US011975820B2

(12) United States Patent
Shmilovich et al.

(10) Patent No.: US 11,975,820 B2
(45) Date of Patent: May 7, 2024

(54) HIGH EFFICIENCY AIRCRAFT FLOW CONTROL ACTUATORS

(71) Applicant: The Boeing Company, Chicago, IL (US)

(72) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 17/652,239

(22) Filed: Feb. 23, 2022

(65) Prior Publication Data
US 2023/0264806 A1 Aug. 24, 2023

(51) Int. Cl.
*B64C 21/04* (2023.01)

(52) U.S. Cl.
CPC .......... *B64C 21/04* (2013.01); *B64C 2230/18* (2013.01)

(58) Field of Classification Search
CPC ....... B64C 21/04; B64C 2230/18; B64C 9/38; B64C 2230/04; Y02T 50/10
See application file for complete search history.

(56) References Cited

U.S. PATENT DOCUMENTS

| 3,841,587 A * | 10/1974 | Freed .................... B64C 23/06 415/914 |
| 8,317,129 B1 * | 11/2012 | Lawson ................. B64D 27/18 244/215 |
| 2002/0134891 A1* | 9/2002 | Guillot ................... B64D 33/02 244/204.1 |
| 2010/0071773 A1* | 3/2010 | Whalen ................. B64C 21/025 137/2 |
| 2018/0281930 A1* | 10/2018 | Koklu .................... B64C 21/04 |

OTHER PUBLICATIONS

Koklu, "Effects of Sweeping Jet Actuator Parameters on Flow Separation Control," NASA Public Access, AIAA J. vol. 56, No. 1, 2018, 49 pages.

* cited by examiner

*Primary Examiner* — Brady W Frazier
*Assistant Examiner* — Shanna Danielle Glover
(74) *Attorney, Agent, or Firm* — Yee & Associates, P.C.

(57) ABSTRACT

A method, apparatus, and system for managing airflow comprising flow control actuators in an aircraft. The flow control actuators comprise channels having inlets and outlets, wherein the channels are located under a surface of the aircraft and the outlets are in communication with the surface of the aircraft. Pressurized air applied to the inlets causes steady air jets to be emitted at the outlets in which the steady air jets add a momentum to airflow over the surface on the aircraft.

19 Claims, 15 Drawing Sheets

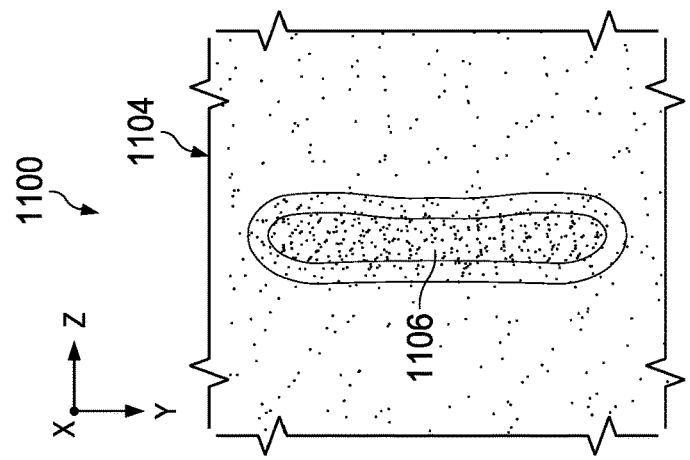
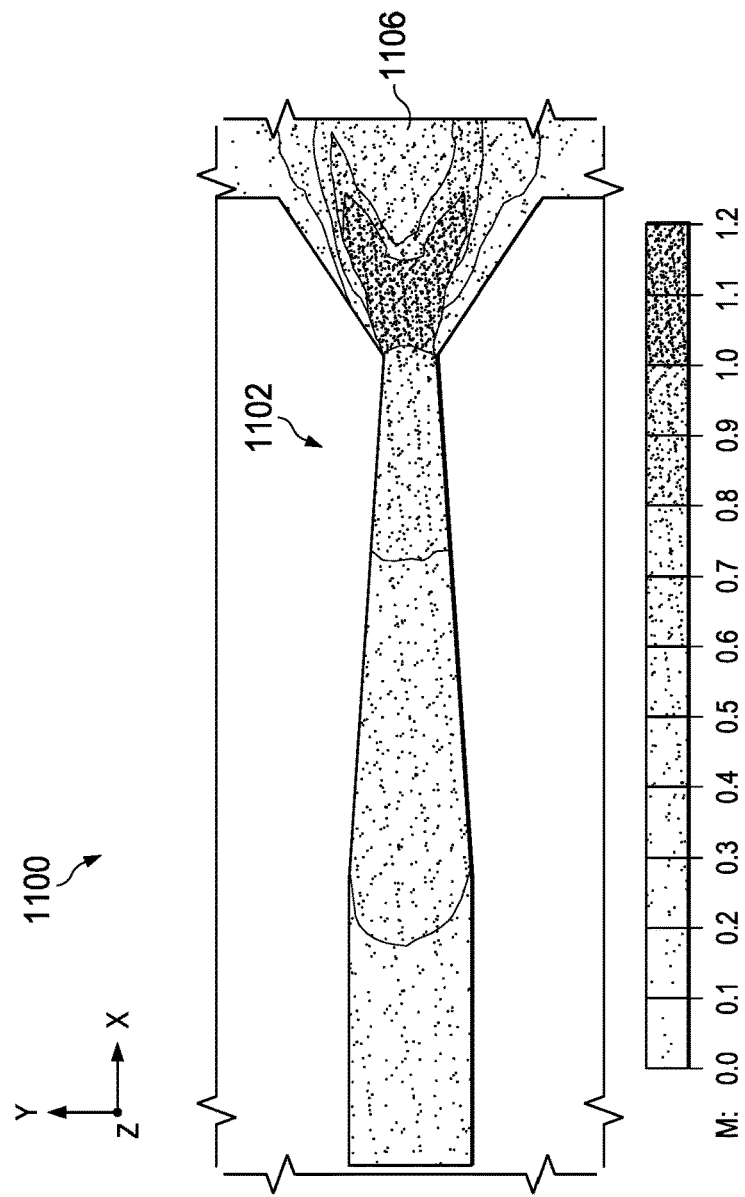

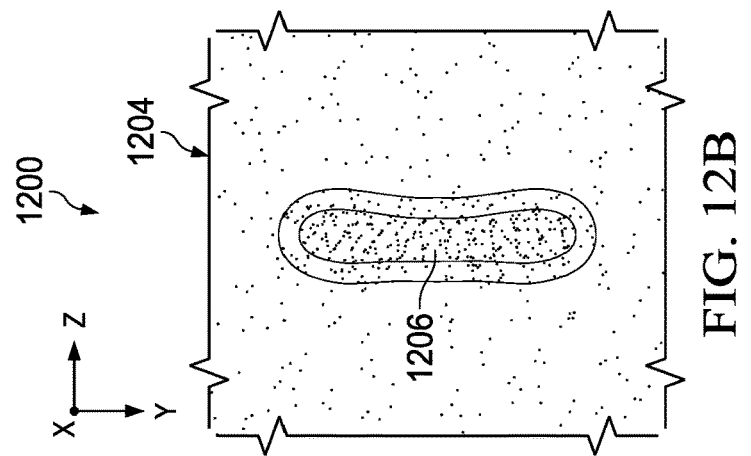
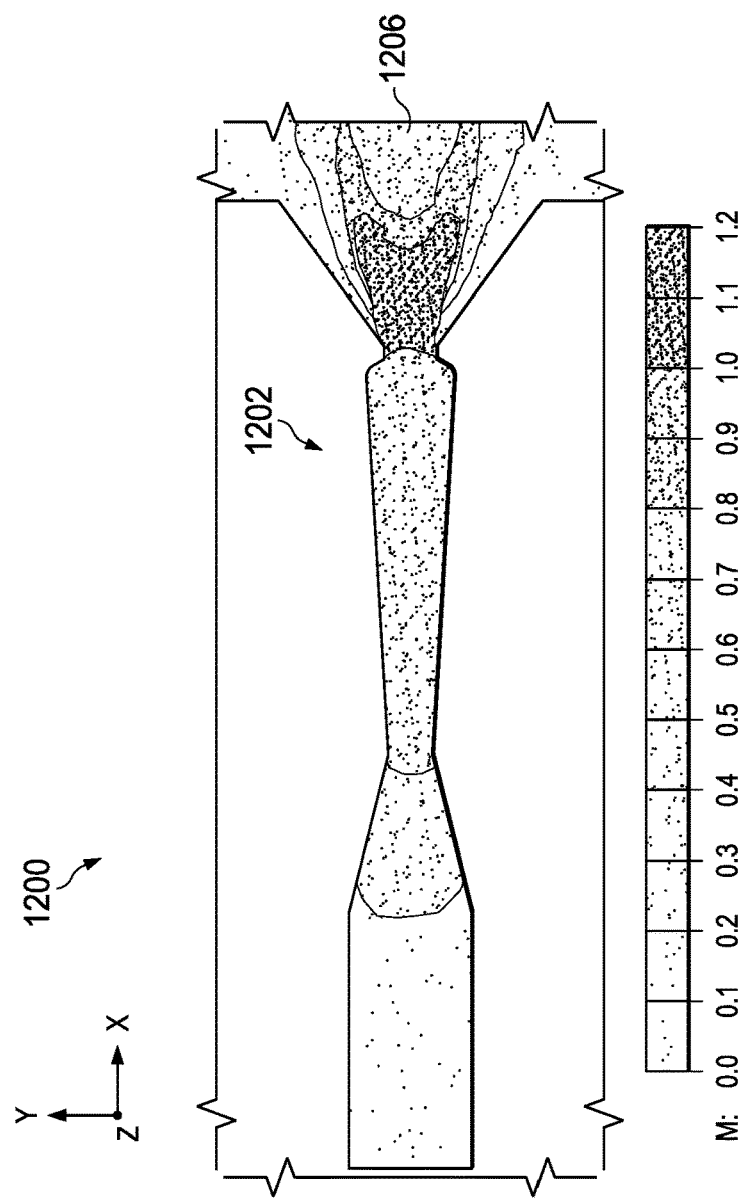

HIGH EFFICIENCY AIRCRAFT FLOW CONTROL ACTUATORS

BACKGROUND INFORMATION

1. Field

The present disclosure relates generally to aircraft and in particular, to flow control actuators for aircraft increasing the performance of aircraft during flight.

2. Background

During flight, the air flows over and under airfoils such as the wings and tails of aircraft. This air flow generates boundary layers over the surfaces of a wing or other airplane components due to viscosity. A thin boundary layer is very efficient since creates less drag and is therefore desirable.

Depending on flight conditions the boundary layers may become thicker and thereby generate larger aerodynamic losses. In certain maneuvers airplane control surfaces may be deployed or deflected, causing the boundary layers to lose momentum, and even to separate from the surfaces. It is desirable to reattach separated flow and promote thinner boundary layers throughout the flight envelop.

Mechanisms such as leading-edge slats, trailing edge flaps, and vortex generators have been used to reduce airflow separation for an aircraft. These mechanisms may not be suitable for use in all situations since these mechanisms do not have sufficient control authority, and hence may not provide as much reduction in airflow separation desired.

Therefore, it would be desirable to have a method and apparatus that take into account at least some of the issues discussed above, as well as other possible issues. For example, it would be desirable to have a method and apparatus that overcome a practical problem with reducing airflow separation on an aircraft.

SUMMARY

An embodiment of the present disclosure provides a flow control system comprising flow control actuators in an aircraft. The flow control actuators comprise channels having inlets and outlets, wherein the channels are located under a surface of the aircraft and the outlets are in communication with the surface of the aircraft. Pressurized air applied to the inlets cause steady air jets to be emitted at the outlets in which the steady air jets add a momentum to airflow over the surface on the aircraft.

In another illustrative embodiment, an aircraft comprises a body; airfoils connected to the body; control surfaces for the airfoils; an air source located in the aircraft; a duct system; flow control actuators, and a controller. The air source operates to generate pressurized air and the duct system is connected to the air source. The flow control actuators have channels without feedback channels. The channels have inlets, outlets, and throats. The inlets are connected to the duct system and the outlets are in communication with an exterior on the surface of the aircraft and positioned relative to control surfaces for the airfoils. The throats in the channels are connected to the outlets for the channels and have a smallest cross sectional area in the channels. The controller is in the aircraft and controls the flow of the pressurized air through the duct system into the inlets causes the pressurized air to travel through the channels and be emitted as steady air jets at the outlets into an airflow over the surface on the aircraft during flight of the aircraft, wherein the steady air jets add a momentum to the airflow.

In yet another illustrative embodiment, a method for managing airflow for an aircraft. The controller in the aircraft controls a flow of pressurized air into inlets in flow control actuators. A pressure of the pressurized air flowing through channels in the flow control actuators connected to the inlets is increased in response to a geometry of the channels. Steady air jets are emitted from outlets connected to the channels. The steady air jets are emitted into to airflow over a surface on the aircraft and a momentum to the airflow.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 11A and 11B are an illustration of airflow speeds through an angled flow control actuator and at a cut downstream of the outlet in the angled flow control actuator in accordance with an illustrative embodiment;

FIGS. 12A and 12B are an illustration of airflow speeds through a curved flow control actuator and at a cut downstream of the outlet in the curved flow control actuator in accordance with an illustrative embodiment;

DETAILED DESCRIPTION

The illustrative embodiments recognize and take into account one or more different considerations. For example, different wing designs, Krueger flaps, and other mechanisms can be used in an attempt to maintain desired airflow with reduced separation of the boundary layer. The illustrative embodiments recognize and take into account that a fluidic oscillator can be used to help promote good quality flow on the wing of an aircraft. A fluidic oscillator comprises an internal structure including a feedback mechanism that creates a periodic side-to-side moving jet. Fluidic oscillators that produce sweeping jets (SWJ) can delay or eliminate flow separation for an airfoil or other aircraft surface by energizing the decelerated flow near the wall by adding momentum to the boundary layer. However, the illustrative embodiments also recognize and take into account that fluidic oscillators may not always provide a desired level of performance in reducing airflow separation.

In many practical applications the high performance target requires operating the fluidic oscillators at high-pressure. Operating fluidic oscillator flow control actuators in high pressure can result in undesired losses in performance. For example, high pressure conditions can cause significant losses due to the unsteady flow within internal loops of a fluidic oscillator that can reduce the sweeping or swiveling motion of the jet output. As a result, the effectiveness of the fluidic oscillator flow control actuator drops.

Additionally, the illustrative embodiments recognize and take into account that the design of fluidic oscillator flow control actuators have a width that limits the ability to physically obtain a density of fluidic oscillator actuators needed to provide a desired level of performance in controlling airflow separation on in aircraft surface. Further, the sweeping jet can also cause undesired stresses leading to structural fatigue on an airfoil such as a wing.

Thus, in recognizing and taking into account the different considerations above, the illustrative embodiments provide a method, apparatus, and system for flow control using flow control actuators that are capable of operating at high pressures with lower internal losses as compared to fluidic oscillators. In one illustrative example, a flow control system comprises flow control actuators in an aircraft. The flow control actuators comprise channels having inlets and outlets, wherein the channels are located under a surface of the aircraft and the outlets are in communication with the surface of the aircraft. Pressurized air applied to the inlets cause steady air jets to be emitted at the outlets in which the steady air jets add a momentum to airflow over the surface on the aircraft.

Figure 1:
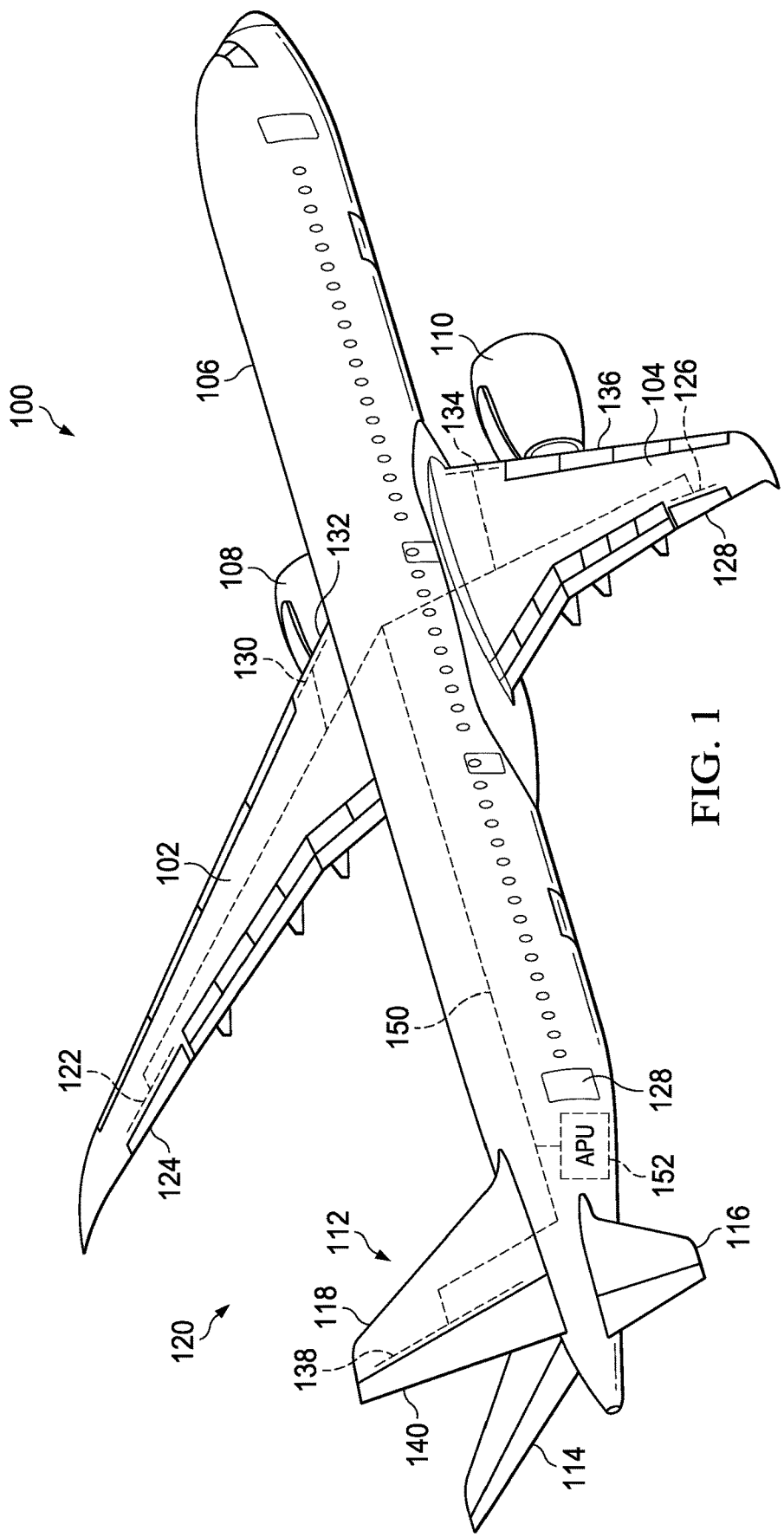
FIG. 1, an illustration of an aircraft is depicted in accordance with an illustrative embodiment.

With reference now to the figures in particular with reference to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a flow control system implemented in accordance with an illustrative embodiment. Flow control system 120 comprises arrays of flow control actuators. As depicted, flow control actuator array 122 is located in front of aileron 124, flow control actuator array 126 is located in front of aileron 128, flow control actuator array 130 is located on leading edge 132 of wing 102, flow control actuator array 134 is located on leading edge 136 of wing 104, and flow control actuator array 138 is located on vertical stabilizer 118 in front of the rudder 140.

As depicted, duct system 150 and auxiliary power unit (APU) 152 are located within the interior of aircraft 100. In this illustrative example, duct system 150 connects the flow control arrays to auxiliary power unit (APU) 152, which supplies pressurized air.

With the application pressurized air to the flow control arrays, air jets are emitted by the different flow control actuators in the flow control actuator arrays. These air jets can add momentum to the boundary layer in the airflow over the surface of aircraft 100. This addition of momentum can reduce flow separation of the boundary layer for a larger area over the control surfaces.

For example, flow control actuator array 122 emits air jets that add an amount of momentum to airflow traveling over aileron 124. The air jets from flow control actuator array 126 can add momentum to airflow traveling over aileron 128. As another illustrative example, flow control actuator array 130 and flow control actuator array 134 emit air jets onto the surface of wing 102 and wing 104, respectively.

As yet another illustrative example, flow control actuator array 138 emits air jets into the airflow traveling over rudder 140. These air jets can reduce flow separation in the boundary layer flowing over these different surfaces of aircraft 100.

Aircraft 100 is one illustrative example. In other illustrative examples, a design of an aircraft can have different numbers of flow control actuators in different locations in aircraft 100. For example, although not shown, a flow control actuator array is present on the other side of vertical stabilizer 118. In yet other illustrative examples, arrays of flow control actuators can be in other locations such as on horizontal stabilizer 114, horizontal stabilizer 116, or other suitable locations. Although shown on the top side of wing 102 and wing 104, flow control actuators can also be located on the bottom side of these wings. In other words, flow control actuators can be placed in any location on aircraft 100 in which the use of air jets can reduce flow separation from a boundary layer in airflow traveling over aircraft 100 during flight of aircraft 100.

Figure 2:
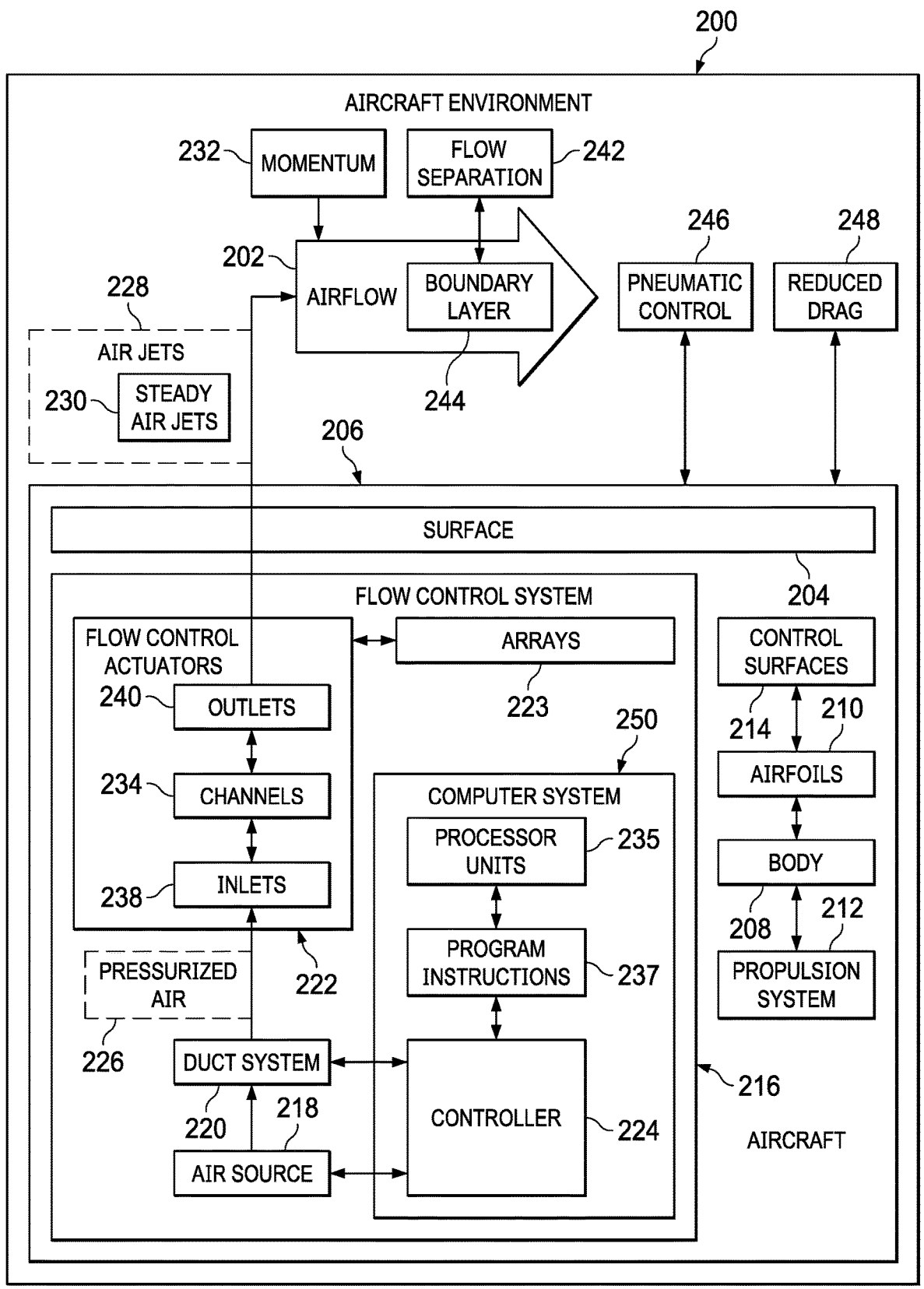
FIG. 2 is an illustration of flow control system in accordance with an illustrative embodiment.

In FIG. 2, an illustration of a block diagram of a flow control system is depicted in accordance with an illustrative embodiment. As depicted, in aircraft environment 200, airflow 202 travels over surface 204 for aircraft 206 during flight of aircraft 206. In this illustrative example, aircraft 206 can take a number different forms. For example, aircraft 206 can be selected from a group comprising a commercial aircraft, a passenger airplane, a rotorcraft, a tilt-rotor aircraft, a tilt wing aircraft, a vertical takeoff and landing aircraft, an electrical vertical takeoff and landing vehicle, a personal air vehicle, and other types of aircraft.

As used herein, a "number of" when used with reference items means one or more items. For example, a number of different forms is one or more forms.

In this illustrative example, aircraft 206 comprises body 208 and airfoils 210 connected to body 208. Body 208 can also be referred to as a fuselage in some illustrative examples.

Airfoils 210 are structures or parts that are designed to provide a desired reaction force when in motion relative to surrounding air. Airfoils 210 can be selected from at least one of a wing, a horizontal stabilizer, a vertical stabilizer, or other suitable structure.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Propulsion system 212 in aircraft 206 is the mechanism that provides force to move aircraft 206. Propulsion system 212 can be selected from at least one of a propeller engine, a turbofan engine, a turboprop engine a ramjet, a rocket, and other suitable types of propulsion systems.

In this illustrative example, aircraft 206 also includes control surfaces 214 for airfoils 210. Control surfaces 214 can be selected from at least one of moveable control surface, a surface on an airfoil, a rudder, an aileron, an elevator, a flap, a spoiler, a slat, or other suitable type of control surface. A control surface is an aerodynamic device that enables adjusting the flight of an aircraft. For example, a control surface can be used to adjust and control the attitude of aircraft 206.

In this illustrative example, a control surface in control surfaces 214 can be a separate device from the airfoil that can be moved or adjusted, such as a flap or aileron. In another illustrative example, a control surface in control surfaces 214 can be a portion of the surface of an airfoil. In this particular example, the control surface does not move but can be affected by pneumatic mechanisms.

As depicted, aircraft 206 also includes flow control system 216. Flow control system 216 can operate to improve the performance of aircraft 206 during flight. In this illustrative example, flow control system 216 comprises air source 218, duct system 220, flow control actuators 222, and controller 224.

In this illustrative example, air source 218 is a source of pressurized air 226. Air source 218 can be selected from at least one of air from an auxiliary power unit (APU), bleed air from an engine in propulsion system 212, air from the compressor, or other suitable sources of pressurized air 226.

Duct system 220 is connected to air source 218. Duct system 220 connects air source 218 to flow control actuators 222. Duct system 220 can include at least one of a pipe, tube, a valve, or other components that can be connected to form a network of conduits or passages used to apply pressurized air 226 to flow control actuators 222.

In this illustrative example, when valves or other controllers are present, pressurized air 226 can be selectively applied to a set of flow control actuators 222. As used herein, a "set of" when used with reference to items means one or more items. For example, a set of flow control actuators 222 is one or more of flow control actuators 222. A set of flow control actuators 222 can be, for example, a flow control actuator array such as flow control actuator array 138 or flow control actuator array 134 in FIG. 1. In other illustrative examples, a set of flow control actuators 222 can be a subset of flow control actuators in a flow control actuator array.

As depicted, flow control actuators 222 can emit air jets 228, such as steady air jets 230 to add an amount of momentum 232 to airflow 202 over surface 204 of aircraft 206. In this illustrative example, a steady air jet in steady air jets 230 is an air jet that is fixed and not sweeping back and forth. In other words, the air jet does not sweep or move side to side during emission of the air jet. Instead, the air jet remains in substantially the same position. The use of air jets 228 can increase performance of aircraft 206 during flight of aircraft 206.

In illustrative example, flow control actuators 222 can be arranged in arrays 223. An array in arrays 223 can be a single or multiple rows of flow control actuators 222.

In this illustrative example, flow control actuators 222 are located in the interior of aircraft 206 under surface 204 of aircraft 206. Flow control actuators 222 comprises channels 234 having inlets 238 and outlets 240. Channels 234 are located under surface 204 of aircraft 206. Inlets 238 are connected to duct system 220. In one illustrative example, inlets 238 and all have the same size, such as the same area for the openings for inlets 238. Outlets 240 are in communication with surface 204 of aircraft 206. The application of pressurized air 226 to inlets 238 cause steady air jets 230 to be emitted at outlets 240 of flow control actuators 222. In this illustrative example, steady air jets 230 add momentum 232 to airflow 202 over surface 204 of aircraft 206.

In this example, momentum 232 can provide a number of features in the operation of aircraft 206. For example, momentum 232 from steady air jets 230 can cause at least one of a reduction in flow separation 242 of boundary layer 244 for airflow 202 from control surfaces 214, pneumatic control 246 of aircraft 206 using momentum 232 added to airflow 202 over control surfaces 214, reduced drag 248 or other desired changes in airflow 202 or the operation of aircraft 206.

As depicted, controller 224 is located in computer system 250 in aircraft 206. In this example, controller 224 in computer system 250 controls the operation of flow control system 216. Controller 224 can be implemented in software, hardware, firmware or a combination thereof. When software is used, the operations performed by controller 224 can be implemented in program code configured to run on hardware, such as a processor unit. When firmware is used, the operations performed by controller 224 can be implemented in program code and data and stored in persistent memory to run on a processor unit. When hardware is employed, the hardware can include circuits that operate to perform the operations in controller 224.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 235 that are capable of executing program instructions 237 implementing processes in the illustrative examples. As used herein a processor unit in the number of processor units 235 is a hardware device and is comprised of hardware circuits such as those on an integrated circuit that respond and process instructions and program code that operate a computer. When a number of processor units 235 execute program instructions 237 for a process, the number of processor units 235 is one or more processor units that can be on the same computer or on different computers. In other words, the process can be distributed between processor units on the same or different computers in a computer system. Further, the number of processor units 235 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Controller 224 in computer system 250 controls the flow of pressurized air 226 through duct system 220 into flow control actuators 222 to generate steady air jets 230. In one illustrative example, controller 224 controls the flow of pressurized air 226 in duct system 220 to apply pressurized air 226 with a pressure ratio at inlets 238 that causes the flow control actuators emit the steady air jets having at least one of a desired velocity profile, desired bulk mass flow versus pressure ratio profile, or a momentum coefficient versus pressure ratio profile.

As another example, Controller 224 controls the flow of pressurized air 226 in duct system 220 to selectively apply pressurized air 226 to flow control actuators 222 to emit a set of steady air jets 230 into airflow 202 over a set of control surfaces 214 to pneumatically control a flight of aircraft 206 using the set of control surfaces 214. For example, one control surface can be a portion of the top surface of a first wing and the other control surface can be a portion of the top surface of a second wing. Controller 224 can control the emission of a set of steady air jets 230 to add momentum 232 to the portion of the top surface of the first wing such that the aircraft rolls or turns left.

In other illustrative examples, with pneumatic control 246, the control surface can be a surface on other airfoils such as a horizontal stabilizer, a tail, or other suitable therefore.

Figure 3:
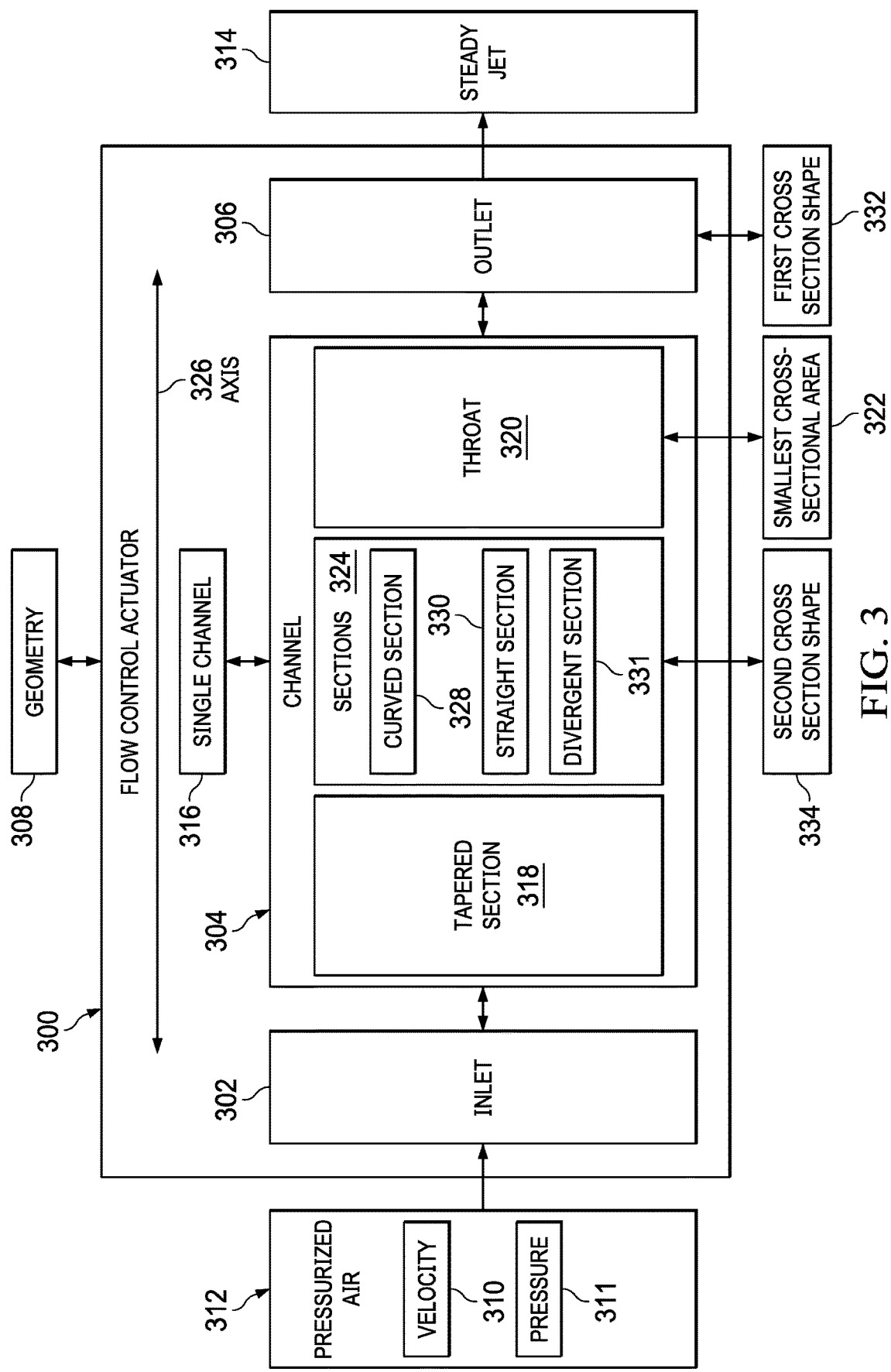
FIG. 3 is an illustration of a block diagram of a flow control actuator in accordance with an illustrative example.

Turning to FIG. 3, an illustration of a block diagram of a flow control actuator is depicted in accordance with an illustrative embodiment. This figure depicts some illustrative examples features for flow control actuators 222 in FIG. 2.

As depicted, flow control actuator 300 is an example of the flow control actuator in flow control actuators 222 in FIG. 2. In this illustrative example, flow control actuator 300 comprises inlet 302, channel 304, and outlet 306. These different components of flow control actuator 300 have geometry 308 that increases velocity 310 of pressurized air 312 applied to inlet 302 of flow control actuator 300. Geometry 308 is also selected to cause pressurized air 312 to be emitted as steady jet 314 with increased velocity.

In this illustrative example, channel 304 is single channel 316. In other words, other channels such as a feedback channel or feedback loop are absent in flow control actuator 300.

Increases in velocity 310 can be achieved through geometry 308 such as tapered section 318 in channel 304. Pressurized air 312 flowing through tapered section 318 can increase in velocity 310 because of the configuration of channel 304.

Additionally, channel 304 has throat 320. In this example, throat 320 helps accelerate the flow of pressurized air 312. At high enough pressure, throat 320 can accelerate the flow to a supersonic velocity. Throat 320 in channel 304 is located after tapered section 318 and is connected to outlet 306.

When one component is "connected" to another component, the connection is a physical connection. For example, a first component, such as tapered section 318, can be considered to be physically connected to a second component by at least one of being secured to the second component, throat 320. The first component can also be considered to be physically connected to the second component by being formed as part of the second component, an extension of the second component, or both. The first component also can be connected to the second component using a third component.

In the illustrative example, throat 320 has smallest cross-sectional area 322 in channel 304. In this illustrative example, smallest cross-sectional area 322 and other cross sections in channel 304 are cross-sections taken such that axis 326 extending centrally through channel 304 is perpendicular to these cross-sections.

In this example, pressurized air 312 accelerates the flow in channel 304 while higher velocity 310 is achieved, and pressure 311 of pressurized air 312 decreases. Depending on the supply pressure, in this example, throat 320 can cause the flow of air to become sonic. As a result, the flow through the throat 320 will accelerate in outlet 306, which is a diverging duct, to further increase velocity 310 to supersonic velocity.

Further, with channel 304 being single channel 316, flow control actuator 300 can be smaller from a top view as compared to the area of a fluidic oscillator flow control actuator which has feedback loops.

Different types of sections 324 can connect tapered section 318 to throat 320. For example, curved section 328 can connect tapered section 318 to throat 320. In another example, straight section 330 can connect tapered section 318 to throat 320. Further, combinations of sections can also be located between tapered section 318 and throat 320. For example, divergent section 331 in sections 324 can be at one in connected to tapered section 318. The other end of divergent section 331 can be connected to curved section 328, which is then in turn connected to throat 320.

With respect to geometry 308 for flow control actuator 300, outlet 306 can have first cross section shape 332 and channel 304 can have second cross section shape 334. For example, first cross section shape 332 and second cross section shape 334 can both be rectangular. In another example, first cross section shape 332 can be circular and second cross section shape 332 can be rectangular.

The different components in flow control actuator 300 can have a number of different dimensions depending on a particular implementation. For example, flow control actuator 300 can have an overall length of 10 inches when implemented on a commercial airplane and 1.0 inch when implemented in an unmanned aerial vehicle (UAV). The length of tapered section 318 can be 60 percent of the overall length, straight section 330 can be 30 percent of the overall length, Ainlet/Athroat=2.5, Aoutlet/Athroat=3.5. In this example, Ainlet is the cross sectional area of the inlet; Athroat is the cross sectional area of the throat; and Aoutlet is the cross sectional area of the outlet. The height of flow control actuator 300 can be 0.25 inches with inlet 302 having a width of 1.25 inches. As another example, throat 320 can have a width of 0.4 inches. In this illustrative example, these dimensions are provided an example and not meant to limit dimensions that can be used in other illustrative examples.

Thus, in one illustrative example, one or more examples are present that overcome a problem with reducing flow separation in the boundary layer of airflow over an aircraft. As a result, one or more illustrative examples can provide an effect reducing flow separation through added momentum to the airflow over an airfoil. Further, one or more examples can enable increasing the density of flow control actuators through the use of single channel flow control actuators having a smaller profile. The illustrative examples can also enable pneumatic control the flight of an aircraft through steady air jets selectively emitted on different control surfaces. Pneumatic control involves changing the direction or attitude of an aircraft using air directed towards a surface of an airfoil instead of using moving service control devices.

The illustration of aircraft environment 200 in the different components described in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in air source 218 can be considered a separate component from flow control system 216 in other implementations. As another example, Turning to FIG. 4, an illustration of perspective view of an angled flow control actuator with is depicted in accordance with an illustrative embodiment. In this illustrative example, angled flow control actuator 400 is an example of an implementation of flow control actuators 222 in FIG. 2 and flow control actuator 300 in FIG. 3.

As depicted, angled flow control actuator 400 comprises inlet 402, channel 404, and outlet 406. Angled flow control actuator 400 is on the xy plane defined by xyz axes 407.

In this view, channel 404 has straight section 408 which then tapers in tapered section 409 to connect to throat 410 at an angle. Channel 404 expands in size from throat 410 to outlet 406 in transition section 412.

Figure 5:
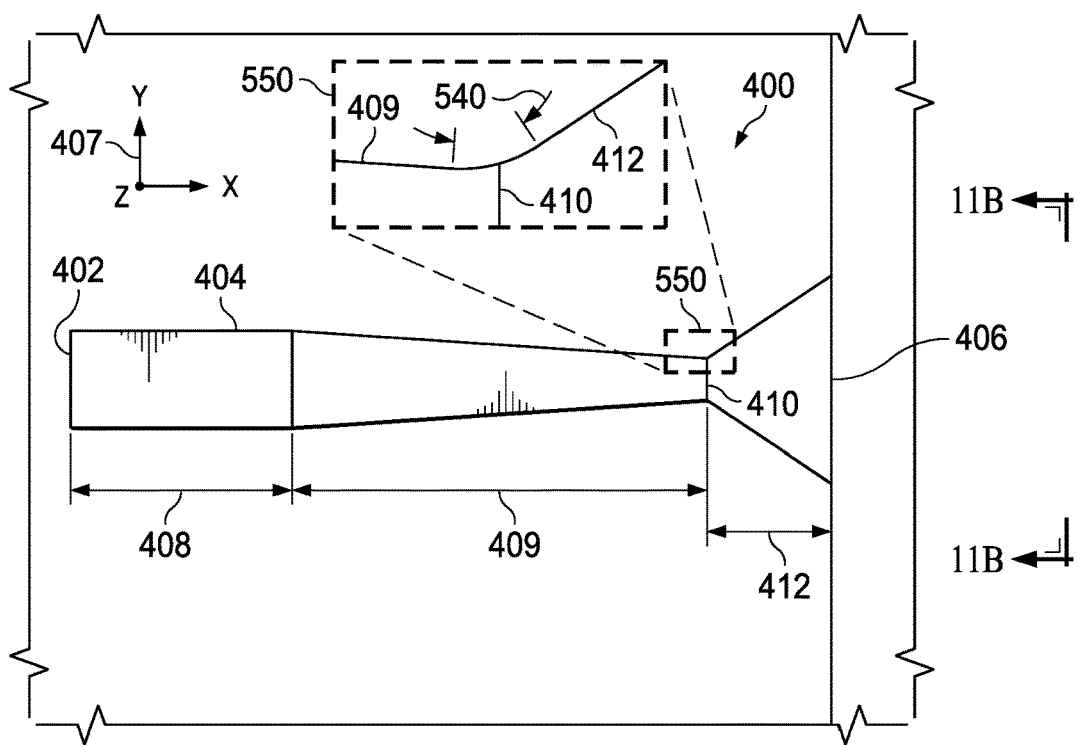
FIG. 5 is an illustration of a top view of an angled flow control actuator in accordance with an illustrative embodiment.

Turning next to FIG. 5, an illustration of a top view of an angled flow control actuator is depicted in accordance with an illustrative embodiment. Angled flow control actuator 400 in this top shown is illustrated on the xy plane defined by xyz axes 407.

In this view, throat 410 in angled flow control actuator 400 is an angled because tapered section 409 in channel 404 connects to throat 410 at an angle.

In this illustrative example, portion 540 of tapered section 409 and transition section 412 that connect to throat 410 in section 550 can have a smooth contour rather than a sharp angle. This contour is depicted in the enlarged view of portion 540 in section 550. The radius of curvature of the contour in portion 540 can be selected such that flow separation at the throat 410, in the transition section 412 and out of outlet 406 is reduced or outright averted.

Figure 6:
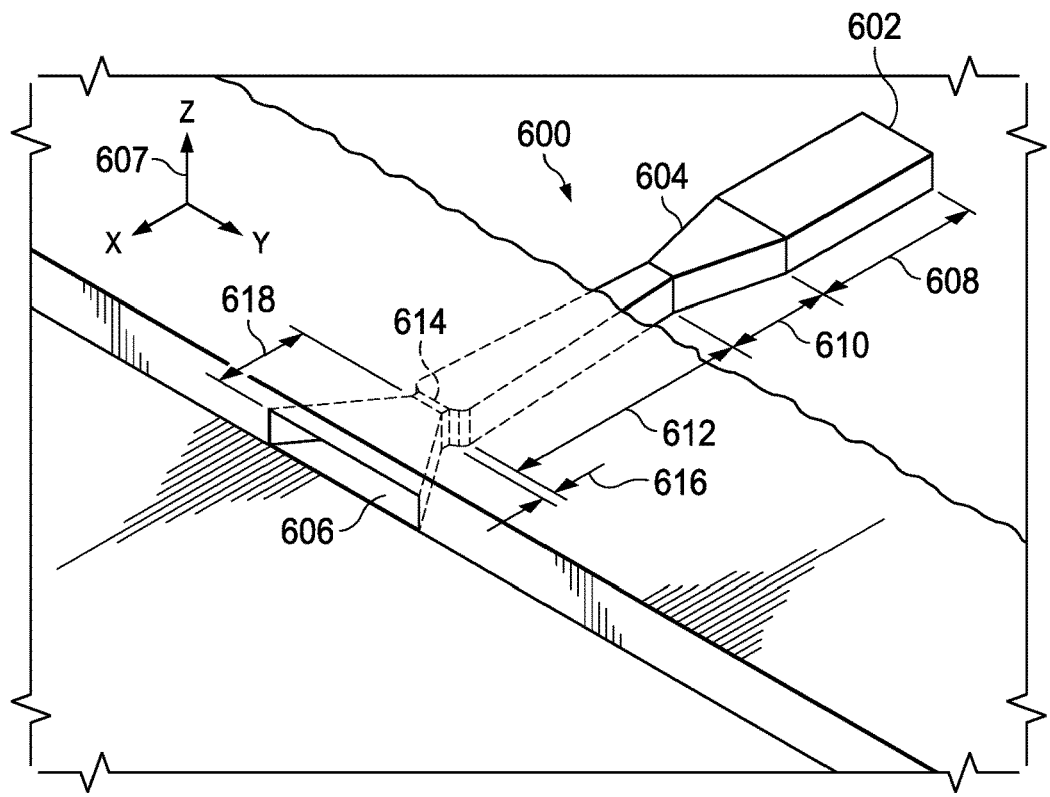
FIG. 6 is an illustration of perspective view of a curved flow control actuator throat in accordance with an illustrative embodiment.

With reference to FIG. 6, an illustration of perspective view of a curved flow control actuator is depicted in accordance with an illustrative embodiment. In this illustrative example, curved flow control actuator 600 is an example of an implementation of flow control actuators 222 in FIG. 2 and flow control actuator 300 in FIG. 3.

As depicted, curved flow control actuator 600 comprises inlet 602, channel 604, and outlet 606. Curved flow control actuator 600 is on the xy plane defined by xyz axes 607.

In this view, channel 604 has straight section 608 which then tapers in tapered section 610 to divergent section 612. Channel 604 curves down in size in curved section 616 which connects divergent section 612 to throat 614. Channel 604 then expands from throat 614 to outlet 606 in transition section 618.

The convergence of channel 604 in tapered section 610 and then the divergence of channel 604 in divergent section 612 can accelerate the flow of air and then lower velocity of the air towards throat 614. This feature is after divergent section 612 as depicted by curved section 616 between divergent section 612 and throat 614. This curved section can have an arc shape prior to throat 614. The arc in curved section 616 can have a sufficiently low curvature (large radius) provides a smoother and more gradual acceleration into throat 614 and transition section 618. This feature helps ensure that the viscous layer does not separate right at the transition from throat 614 to transition section 618.

Figure 7:
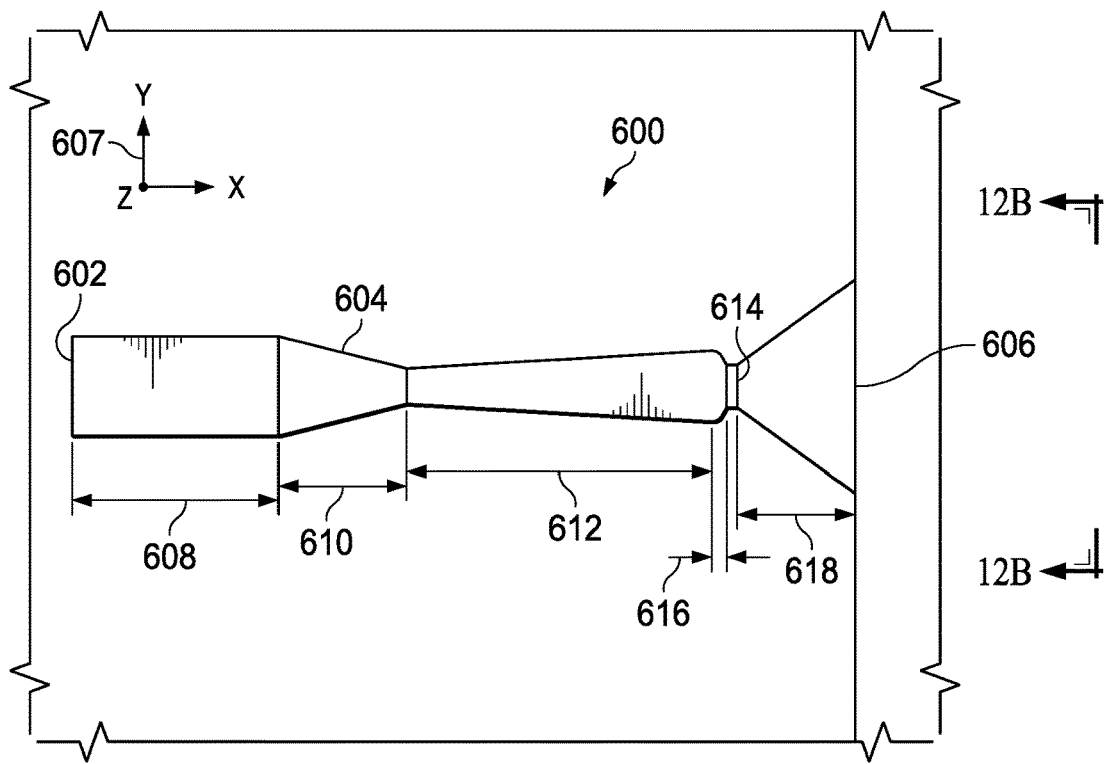
FIG. 7 is an illustration of a top view of a curved flow control actuator in accordance with an illustrative embodiment.

With reference next to FIG. 7, an illustration of a top view of a curved flow control actuator is depicted in accordance with an illustrative embodiment. Curved flow control actuator 600 in this top view is illustrated on the xy plane defined by xyz axes 607.

In this view, curved flow control actuator 600 is curved because curved section 616 in channel 604 connects divergent section 612 in channel 604 to throat 614 with a curved shape.

Figure 8:
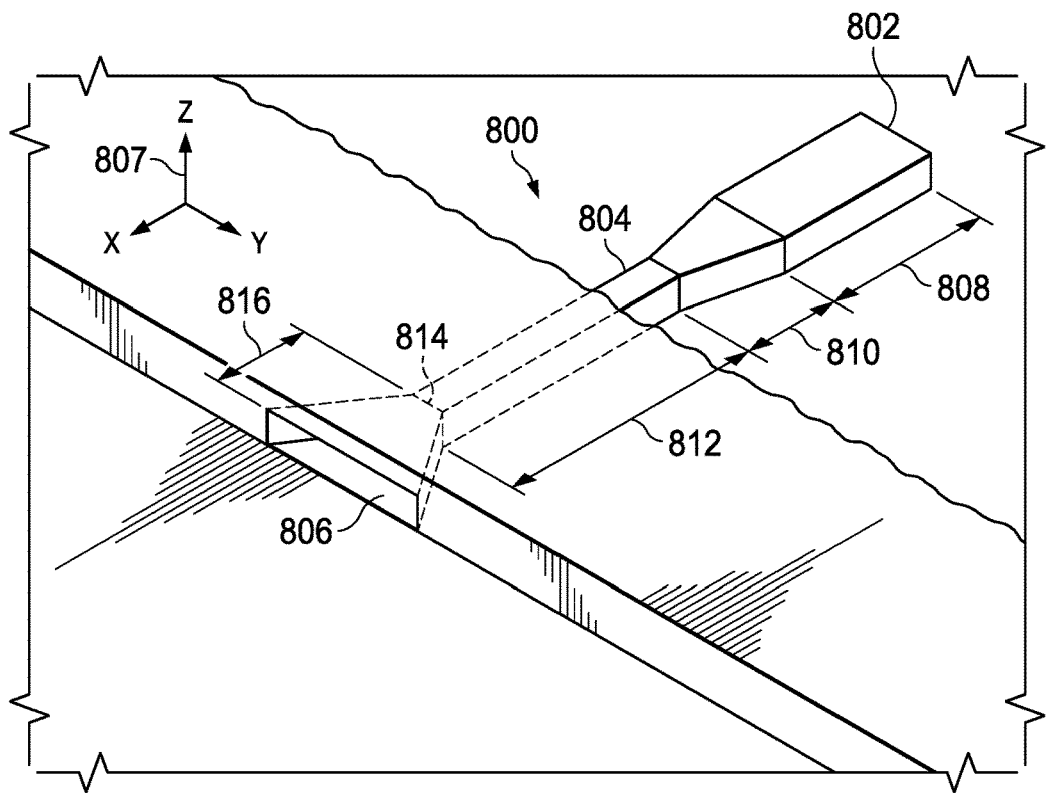
FIG. 8 is an illustration of perspective view of a duct flow control actuator in accordance with an illustrative embodiment.

In FIG. 8, an illustration of perspective view of a duct flow control actuator with a ducted throat is depicted in accordance with an illustrative embodiment. In this illustrative example, curved flow control actuator 600 is an example of an implementation of flow control actuators 222 in FIG. 2 and flow control actuator 300 in FIG. 3.

As depicted, duct flow control actuator 800 comprises inlet 802, channel 804, and outlet 806. Duct flow control actuator 800 is on the xy plane defined by xyz axes 807.

Channel 804 as straight section 808 which then tapers in tapered section 810 to straight section 812. Straight section 812 connects to throat 814. Channel 804 then expands from throat 814 to outlet 806 in transition section 816.

In this illustrative example, straight section 808 provides a more gradual change in velocity as the air travels into throat 814. The velocity is nearly constant and then accelerates into transition section 816. This feature reduces the propensity of the air flow to separate right at throat 814 and further. This feature is particularly important when the divergent angle of transition section 816 is large, for example, angles in the range of 60 degrees to 180 degrees. As the divergent angle of transition section 816 increases, the feature contribute becomes more to important in reducing the propensity of the air flow to separate.

Figure 9:
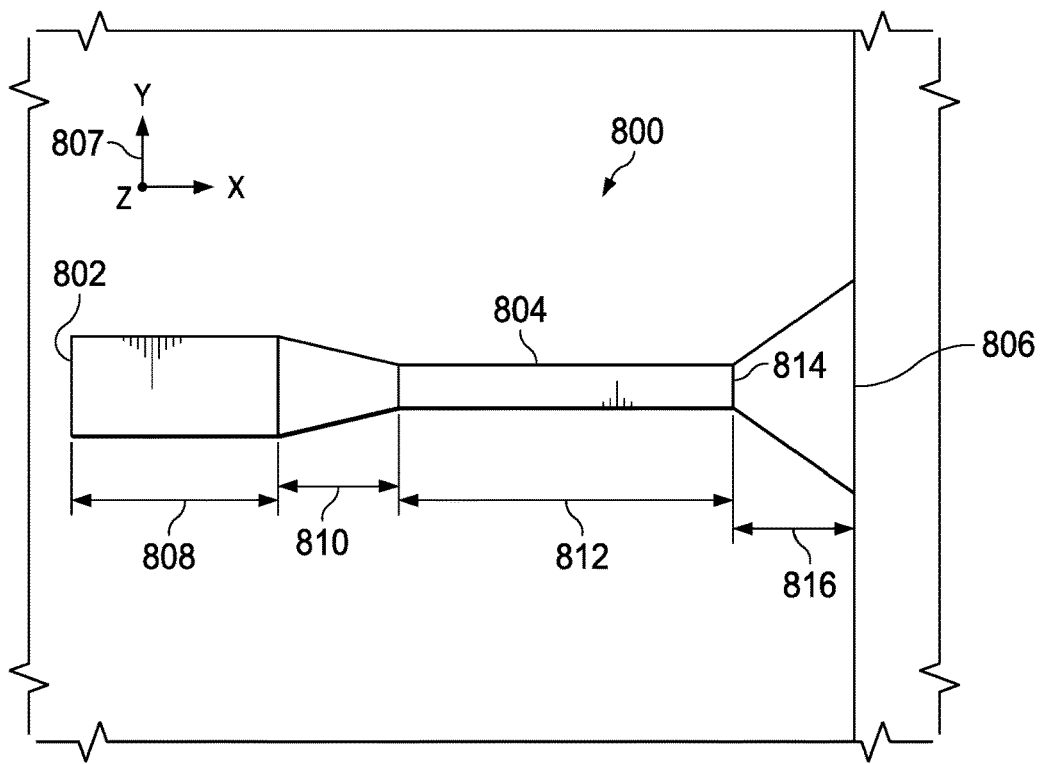
FIG. 9 is an illustration of a top view of a duct flow control actuator in accordance with an illustrative embodiment.

With reference next to FIG. 9, an illustration of a top view of a duct flow control actuator with a ducted throat is depicted in accordance with an illustrative embodiment. As depicted, throat 814 in duct flow control actuator 800 is a ducted because straight section 812 does not taper or expand when connected to throat 814. Further, throat 814 and straight section 812 both have the smallest cross-sectional area in duct flow control actuator 800.

Figure 10:
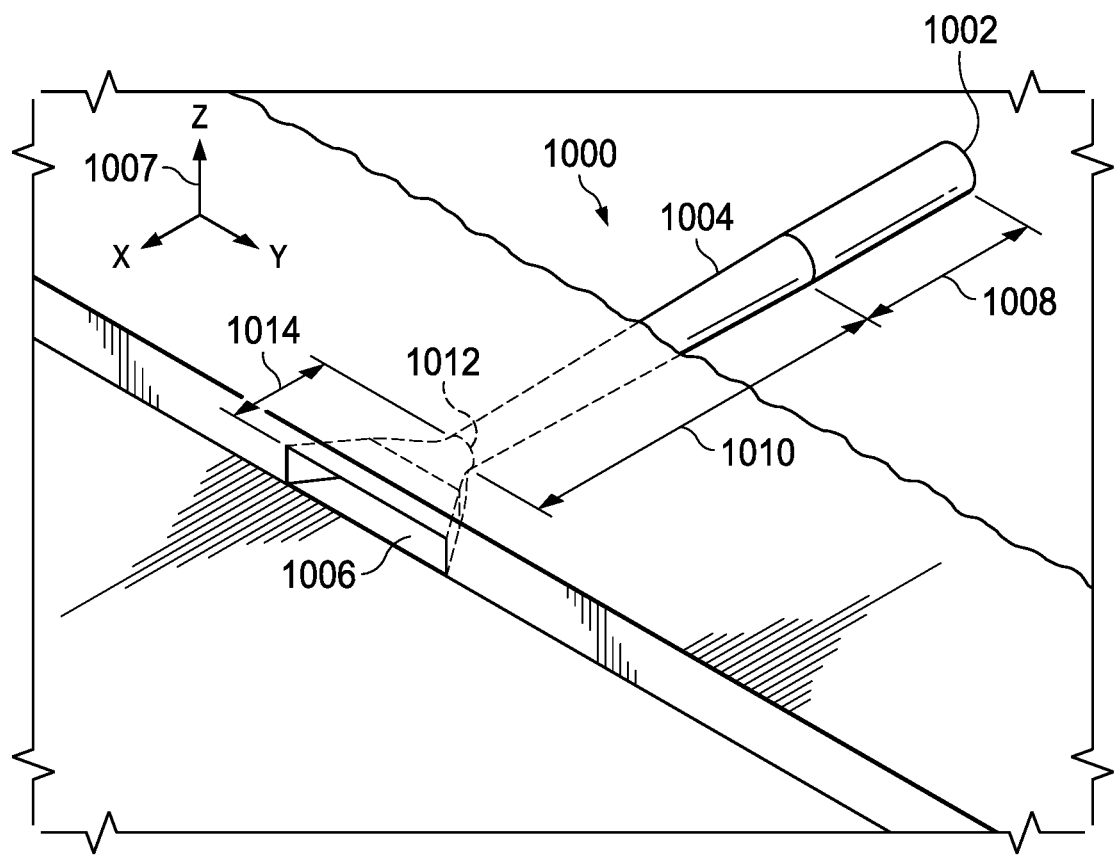
FIG. 10 is an illustration of a perspective view of a flow control actuator with cylindrical channel in accordance with an illustrative embodiment.

Turning next to FIG. 10, an illustration of a perspective view of a flow control actuator with cylindrical channel is depicted in accordance with an illustrative embodiment. An illustration of perspective view of a flow control actuator with a ducted throat is depicted in accordance with an illustrative example. In this illustrative example, flow control actuator 1000 is an example of an implementation of flow control actuators 222 in FIG. 2 and flow control actuator 300 in FIG. 3.

As depicted, flow control actuator 1000 has inlet 1002, channel 1004, and outlet 1006. Flow control actuator 1000 is on the xy plane defined by xyz axes 1007.

As depicted, channel 1004 has straight section 1008 and tapered section 1010. Tapered section 1010 in channel 1004 tapers to connect to throat 1012. Transition section 1014 connects throat 1012 to outlet 1006. In this example, Transition section 1014 is an angled tapered section because of the angle at which transition section 1014 connects to throat 1012.

In this illustrative example, inlet 1002 and channel 1004 have circular cross-sections while outlet 1006 has a rectangular cross-section. Transitional section 1014 has transitional cross-sectional shapes that transition from a circular cross-sectional shape to a rectangular cross-section shape through a series of elliptical cross-section shapes.

The illustration of flow control actuators in FIGS. 4-10 is provided as an example of some implementations for flow control actuators 222 shown in block form in FIG. 2. Illustration of the flow control actuators in these figures are not meant to limit the manner in which other flow control actuators can be implemented. The different examples have been selected as having geometries within the channels that can increase the velocity of airflow and increase the efficiency and effectiveness of air jets output by the flow control actuators. These different flow control actuators have geometries that can reduce internal losses associated with flow unsteadiness while providing a more compact configuration as compared to a fluidic oscillator flow control actuator.

Figure 4:
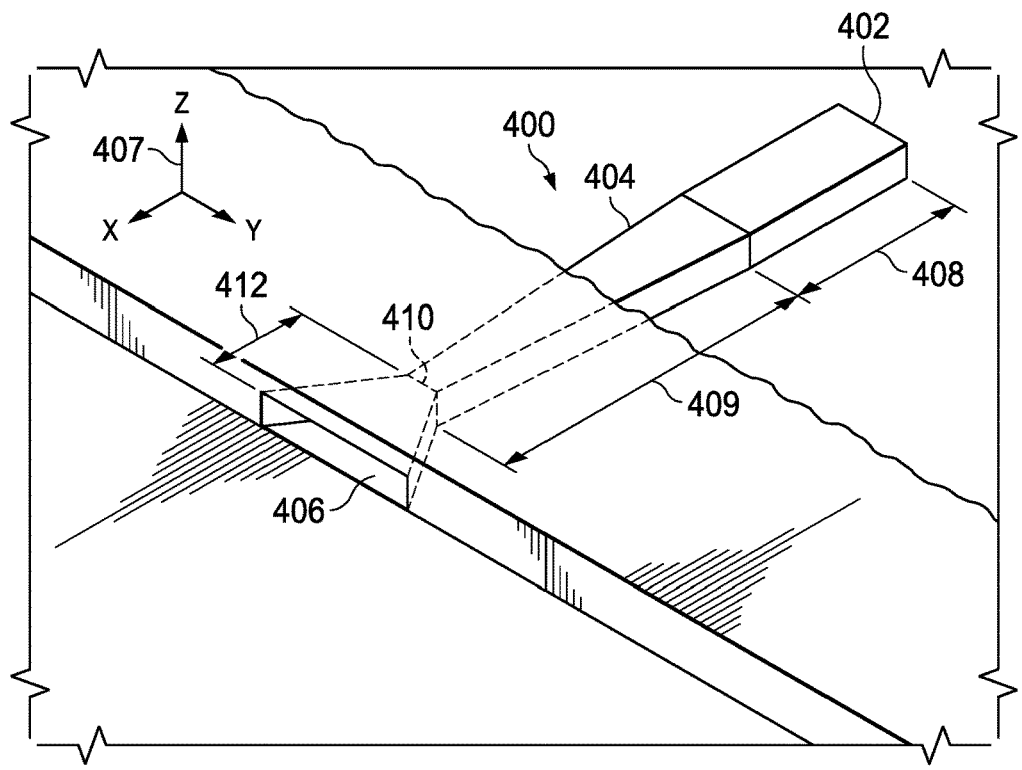
FIG. 4 is an illustration of perspective view of an angled flow control actuator in accordance with an illustrative embodiment.

With reference to FIGS. 11A and 11B, an illustration of airflow speeds through an angled flow control actuator and at a cut downstream of the angled flow control actuator is depicted in accordance with an illustrative embodiment. As depicted, airflow graphs 1100 depicted airflow speeds for angled flow control actuator 400 as shown in FIG. 4 and FIG. 5.

In this example, airflow graph 1102 shows the speed at which air flows through flow control actuator 400 in the top view depicted in FIG. 5. Airflow graph 1104 depicts airflow for angled flow control actuator 400 in the direction of lines 11-11 in FIG. 5 at a cut downstream of the outlet 406 at a distance of one outlet width.

As depicted, steady air jet 1106 can be seen in airflow graph 1102 and airflow graph 1104.

Turning now to FIGS. 12A and 12B, an illustration of airflow speeds through a curved flow control actuator and at a cut downstream of the curved flow control actuator is depicted in accordance with an illustrative embodiment. As depicted, airflow graphs 1200 depicted airflow speeds for a curved flow control actuator 600 as shown in FIG. 4 and FIG. 5. In this example, airflow graph 1202 shows the speed at which air flows through curved flow control actuator 600 in the top view depicted in FIG. 7. Airflow graph 1204 depicts airflow for curved flow control actuator 600 in the direction of lines 12-12 in FIG. 7.

In FIGS. 11A and 11B and FIGS. 12A and 12B, the pressurized air applied to the inlets has a pressure is 4 times the ambient pressure, the temperature is the same as ambient temperature. Angled flow control actuator 400 and curved flow control actuator 600 have a length actuator of 3.7 inches, an inlet width of 0.5 inches, a throat width of 0.2 inches, an outlet width of 1.0 inches, an actuator height of 0.1 inches, and divergent section angle of 70 degrees.

As depicted, steady air jet 1206 can be seen in airflow graph 1202 and airflow graph 1204.

Figure 13:
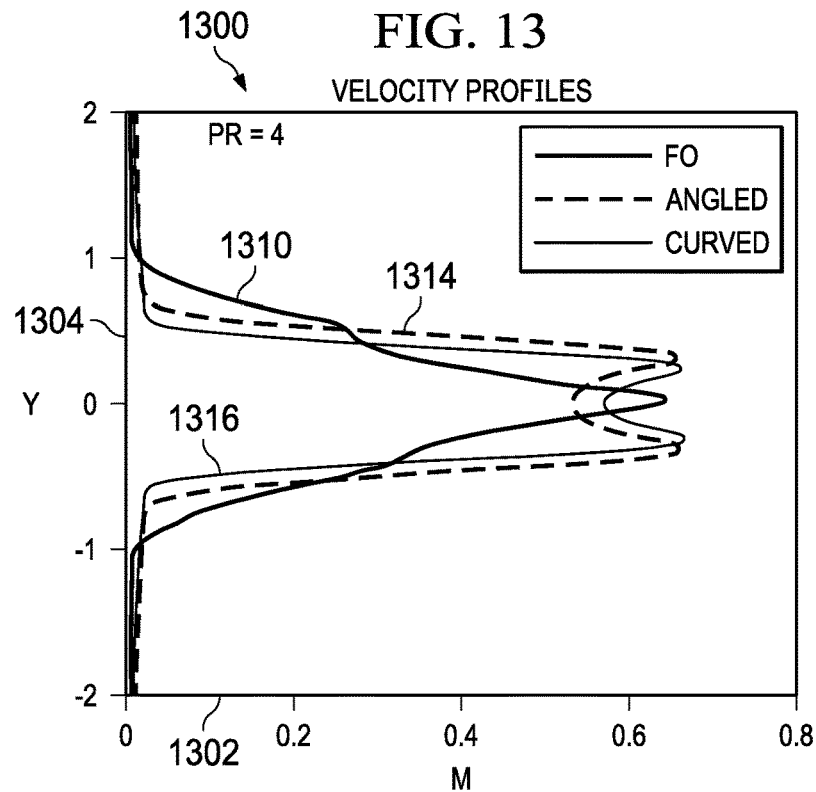
FIG. 13 is an illustration of velocity profiles downstream of the outlet for flow control actuators in accordance with an illustrative embodiment.

Turning next to FIG. 13, an illustration of velocity profiles for flow control actuators is depicted in accordance with an illustrative embodiment. Graph 1300 illustrates velocity profiles at a station downstream of the outlet stations of the respective actuators at a distance of one outlet width. Graph 1300 depicts the speed in Mach numbers on x-axis 1302 versus y axis 1304, where y=0 corresponds to the centerline bisecting the flow control actuators on xy plane such as the xy planes defined using xyz axes in FIGS. 4-10.

In this illustrative example, graph 1300 illustrates velocity profiles for three types of flow control actuators. Line 1310 illustrates a velocity profile for a fluidic oscillator flow control actuator. Line 1314 shows the velocity profile for angled flow control actuator 400 as shown in FIG. 4 and FIG. 5 with airflow speeds as show in airflow graphs 1200 in FIG. 12. Line 1316 shows the velocity profile for a curved flow control actuator 600 as shown FIG. 6 and FIG. 7 with airflow speeds as show in graph 1300 in FIG. 12.

As depicted, the air jets for the angled flow control actuator and the curved flow control actuator show increased performance with respect to the width of the air jets as compared to that for the fluidic oscillator control actuator.

Figure 14:
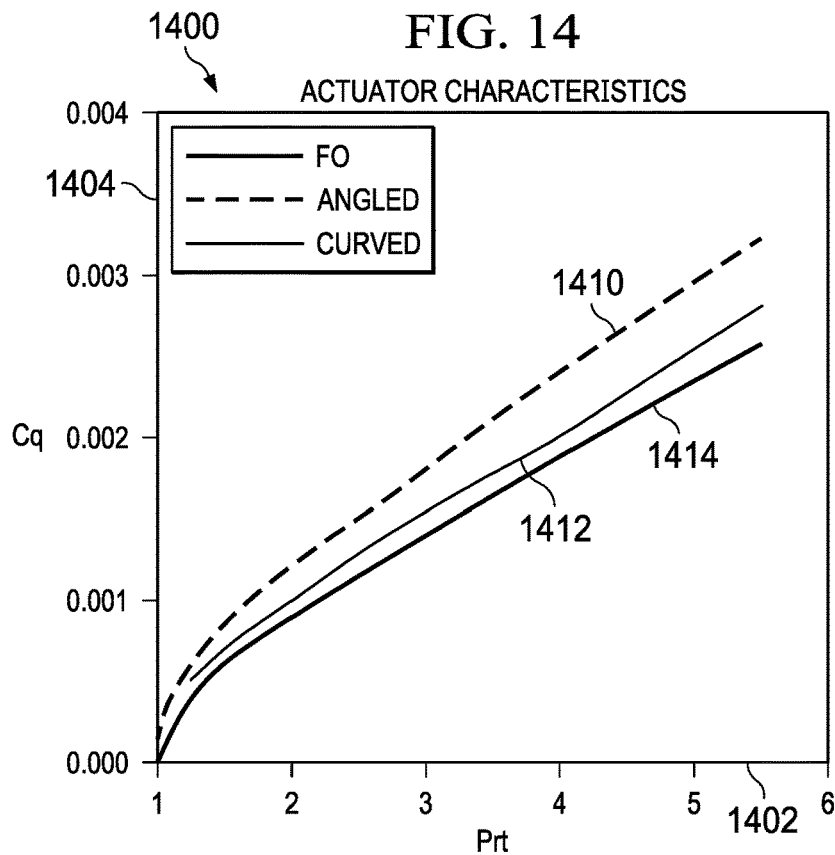
FIG. 14 is an illustration of actuator characteristics for flow control actuators in accordance with an illustrative embodiment.

With reference to FIG. 14, an illustration of actuator characteristics for flow control actuators is depicted in accordance with an illustrative embodiment. In this illustrative example, graph 1400 illustrates actuator characteristics. X-axis 1402 is total pressure ratio (PRT), and y-axis 1404 is the coefficient of mass flow (Cq).

In this illustrative example, graph 1400 illustrates the mass flow that can be obtained for given supply pressure for three types of flow control actuators. Line 1410 illustrates actuator characteristics for angled flow control actuator 400 as shown in FIG. 4 and FIG. 5. Line 1412 shows the actuator characteristics for curved flow control actuator 600 as shown in FIG. 6 and FIG. 7. Line 1414 shows actuator characteristics for fluidic oscillator flow control actuator.

As depicted, the angled flow control actuator and the curved flow control actuator have a coefficient of mass flow increases more quickly with respect to the total pressure ratio as compared to the fluidic oscillator flow control actuator. For a given supply pressure coefficient PRT, the angled flow control actuator and the curved flow control actuator allow more air to flow through compared to the fluidic oscillator. Equivalently, for a desired mass flow coefficient, the fluidic oscillator requires higher supply pressure PRT relative to the angled flow control actuator and the curved flow control actuator.

Figure 15:
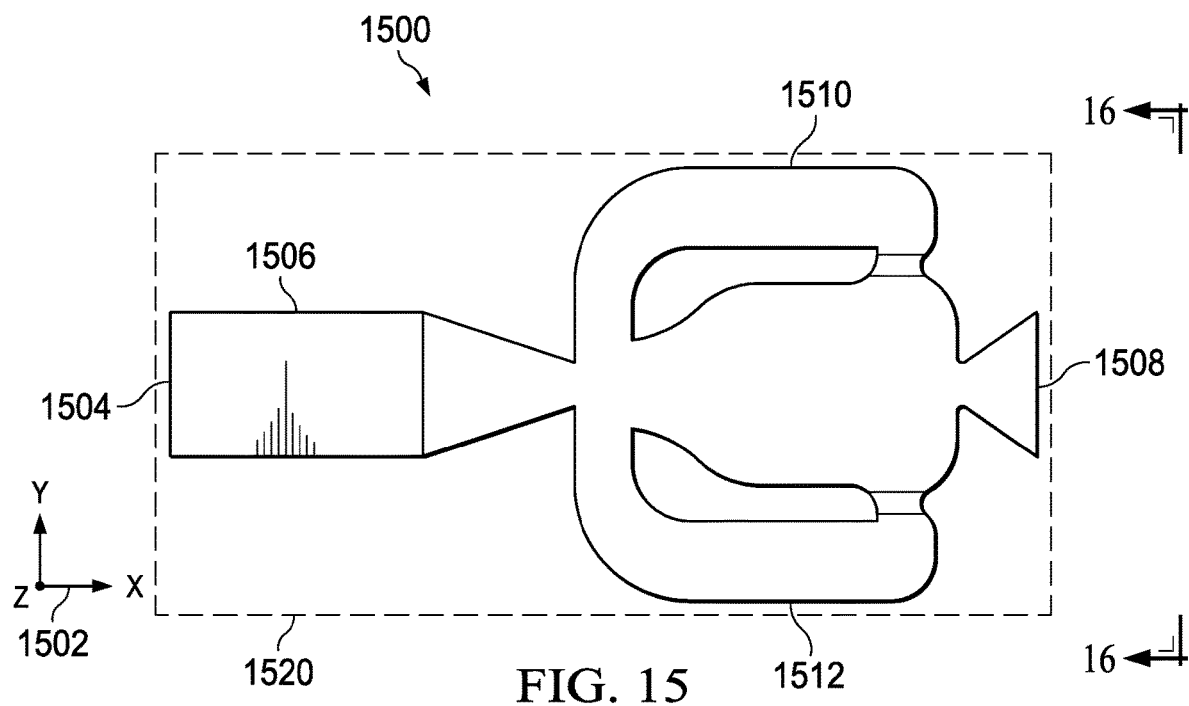
FIG. 15 is an illustration of a top view of a fluidic oscillator flow control actuator in accordance with an illustrative embodiment.

With reference to FIG. 15, an illustration of a top view of a fluidic oscillator flow control actuator is depicted in accordance with an illustrative embodiment. As depicted, a top view of fluidic oscillator flow control actuator 1500 is seen with reference to xyz axes 1502.

As depicted from this top view, fluidic oscillator flow control actuator 1500 has inlet 1504, main channel 1506, outlet 1508, first feedback loop 1510, and second feedback loop 1512. First feedback loop 1510 and second feedback loop 1512 are channels that provide feedback of air passing through main channel 1506. In this example, main channel 1506 is the main channel in fluidic oscillator flow control actuator 1500.

The configuration of current fluidic oscillator flow control actuators reduces the ability to increase the density of flow control actuators in an array. However, different components in fluidic oscillator flow control actuator 1500 are not all aligned on xy plane 1520 defined using xyz axes 1502.

Figure 16:
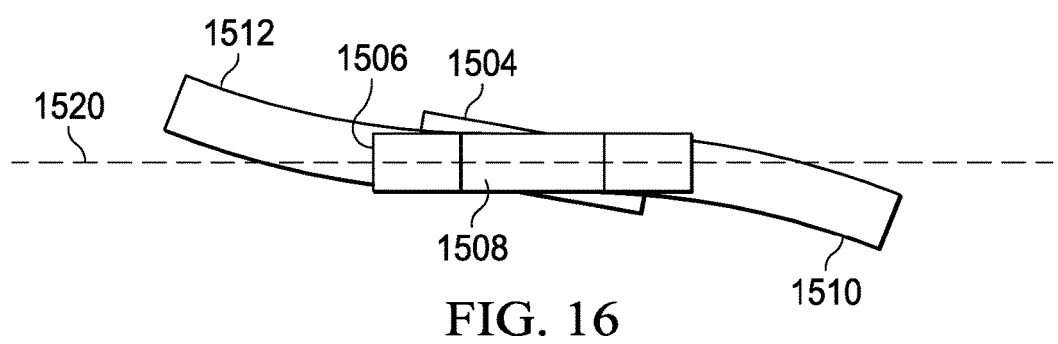
FIG. 16 is an illustration of a front view of a fluidic oscillator flow control actuator in accordance with an illustrative embodiment.

In FIG. 16, an illustration of a front view of a fluidic oscillator flow control actuator is depicted in accordance with an illustrative embodiment. As depicted, this front of fluidic oscillator flow control actuator 1500 seen in the direction of lines 16-16 in FIG. 15.

As illustrated in this front view, not all of the components for fluidic oscillator flow control actuator 1500 are aligned on xy plane 1520. As depicted, main channel 1506 is bisected by xy plane 1520 as well as outlet 1508. As depicted, second feedback loop 1512 extends away from xy plane 1520 which is above xy plane in this illustration. On the other hand, first feedback loop 1510 extends away from the xy plane 1520 in an opposite direction, which is below xy plane 1520 in this example.

Figure 17:
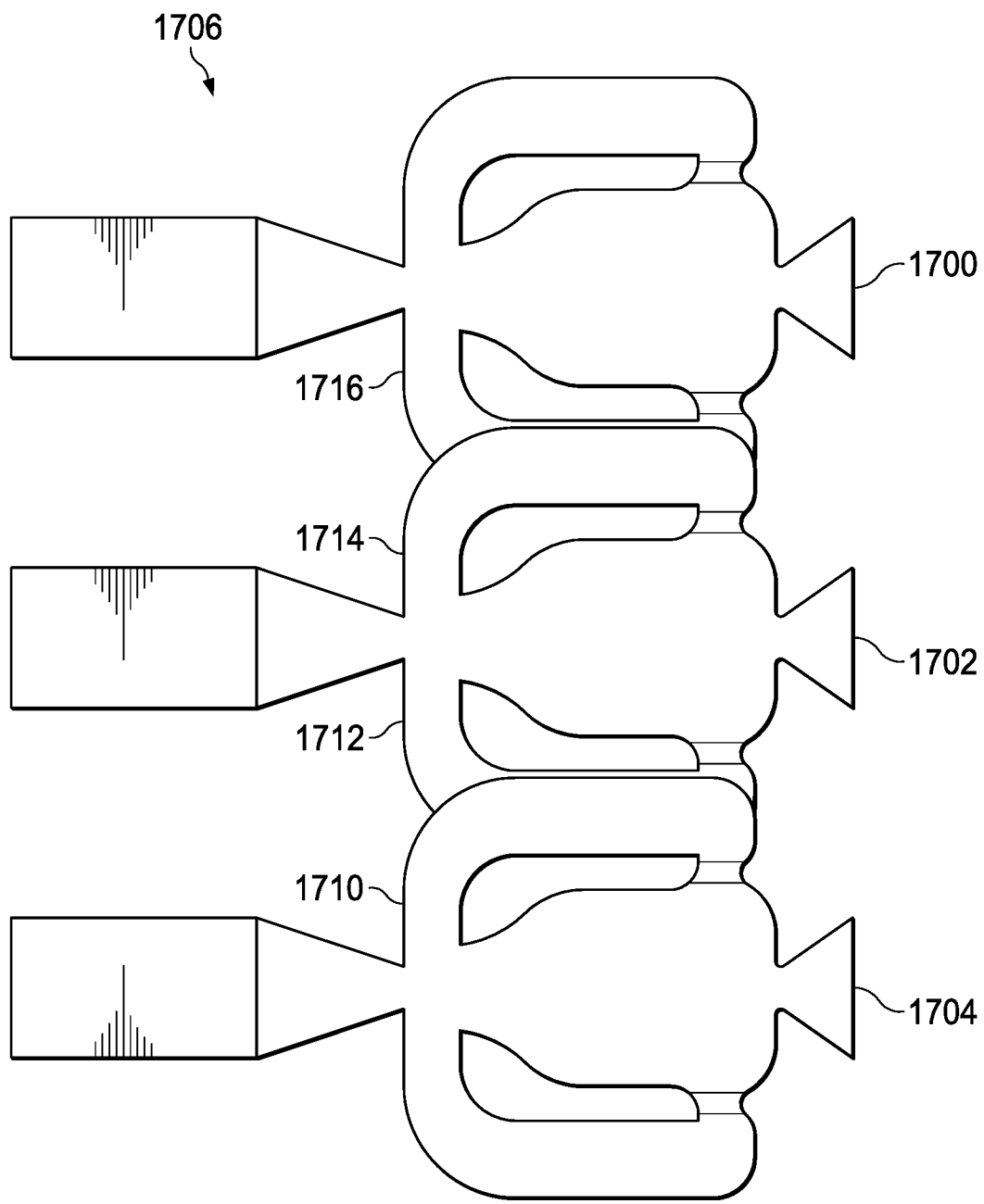
FIG. 17 is an illustration of an array of fluidic oscillator flow control actuators in accordance with an illustrative embodiment.

Turning to FIG. 17, an illustration of an array of fluidic oscillator flow control actuators is depicted in accordance with an illustrative embodiment. In this illustrative example, fluidic oscillator flow control actuator 1700, fluidic oscillator flow control actuator 1702, and fluidic oscillator flow control actuator 1704 are aligned in array 1706.

As can be seen in in this illustrative example, these fluidic oscillator flow control actuators have feedback loops that overlap each other. Example, feedback loop 1710 for fluidic oscillator flow control actuator 1704 overlaps feedback loop 1712 for fluidic oscillator flow control actuator 1704. Feedback loop 1714 for fluidic oscillator flow control actuator 1702 overlaps feedback loop 1716 for fluidic oscillator flow control actuator 1700.

This overlap is possible because these fluidic oscillator flow control actuators used a configuration such as that for fluidic oscillator flow control actuator 1500 as shown in FIG. 15 and FIG. 16, such that no fluidic oscillator infringes on the space occupied by its neighbors. As a result, the density of fluidic oscillator flow control actuators in array 1706 can be increased as compared to using current designs for fluidic oscillator flow control actuators.

Figure 18:
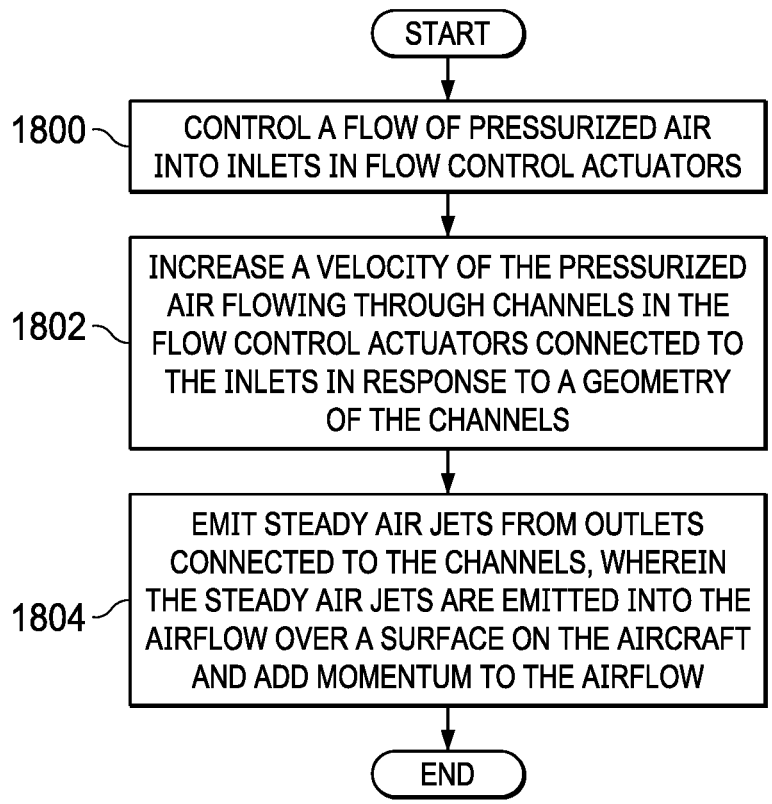
FIG. 18 is an illustration of a flowchart of a process for managing airflow for an aircraft in accordance with an illustrative embodiment.

Turning next to FIG. 18, an illustration of a flowchart of a process for managing airflow for an aircraft is depicted in accordance with an illustrative embodiment. The process in FIG. 18 can be implemented in hardware, software, or both. When implemented in software, the process can take the form of program code that is run by one of more processor units located in one or more hardware devices in one or more computer systems. For example, the process can be implemented in controller 224 in computer system 250 in FIG. 2.

The process begins by controlling a flow of pressurized air into inlets in flow control actuators (operation 1800). The process increases a velocity of the pressurized air flowing through channels in the flow control actuators connected to the inlets in response to a geometry of the channels (operation 1802).

The process emits steady air jets from outlets connected to the channels, wherein the steady air jets are emitted into to airflow over a surface on the aircraft and add a momentum to the airflow (operation 1804). The process terminates thereafter.

Figure 19:
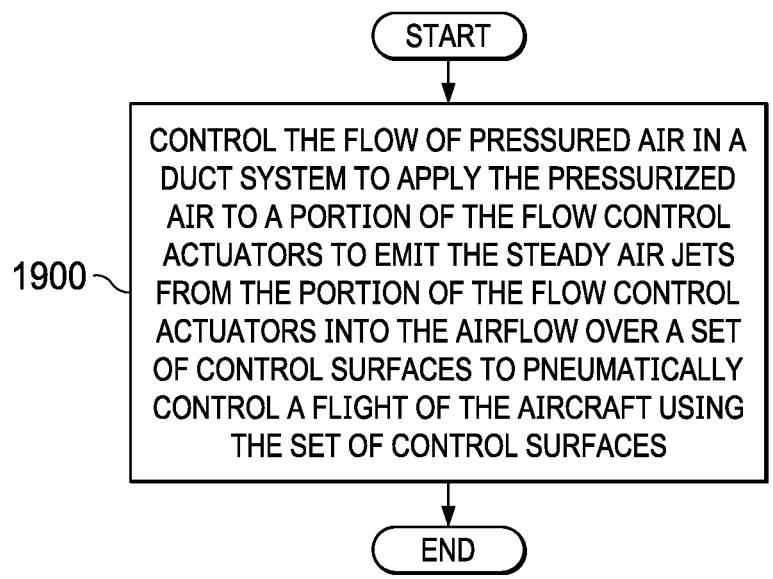
FIG. 19 is an illustration of a flowchart of a process for managing airflow for an aircraft in accordance with an illustrative embodiment.

With reference now to FIG. 19, an illustration of a flowchart of a process for managing airflow for an aircraft is depicted in accordance with an illustrative embodiment. The process in this flowchart is an example of an implementation of operation 1800. This process controls the airflow to control the flight of the aircraft using pneumatic control though the air jets generated by the flow control actuators.

The process controls the flow of pressured air in a duct system to apply the pressurized air to a portion of the flow control actuators to emit the steady air jets from the portion of the flow control actuators into the airflow over a set of control surfaces to pneumatically control a flight of the aircraft using the set of control surfaces (operation 1900). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
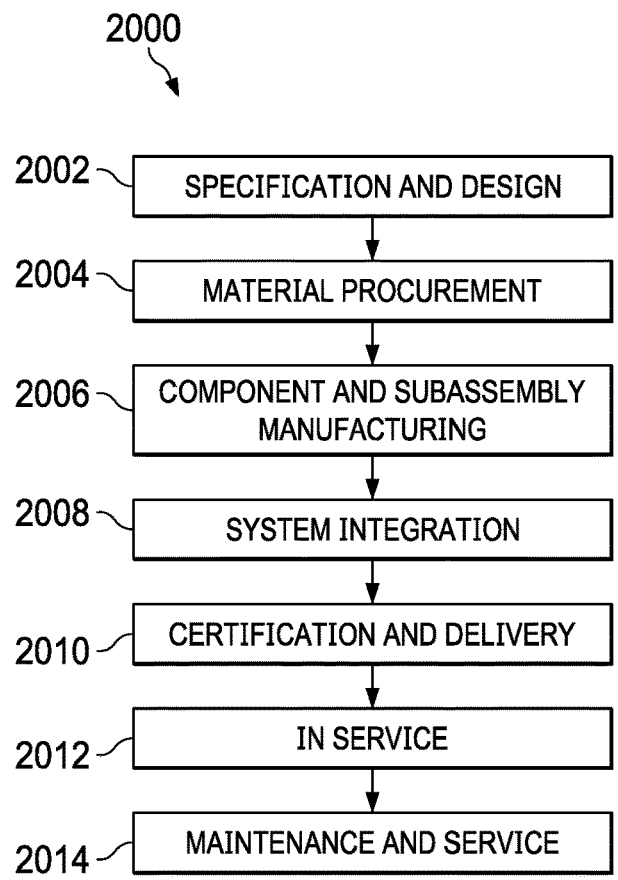
FIG. 20 is an illustration of an aircraft manufacturing and service method in accordance with an illustrative embodiment.
Figure 21:
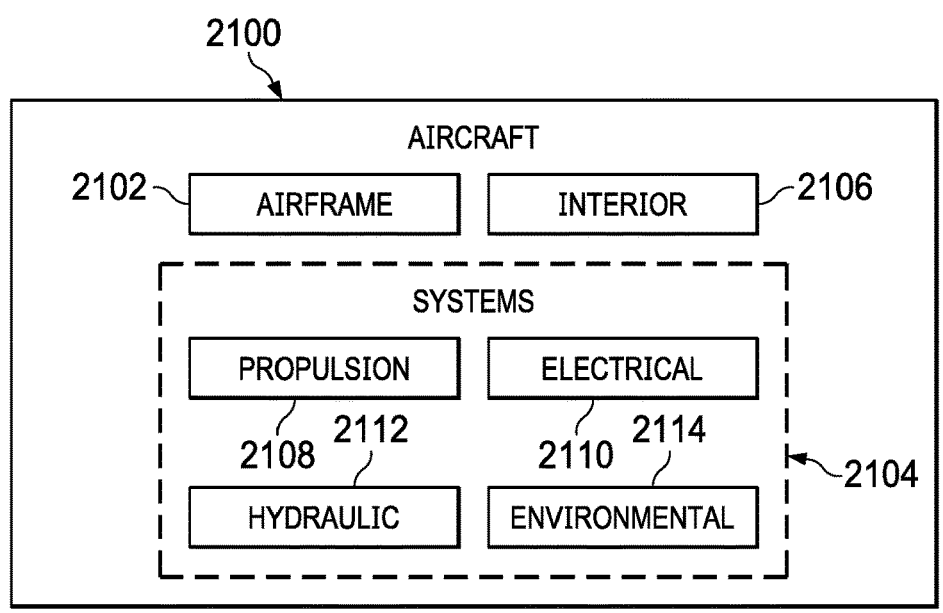
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

For example, flow control systems including flow control actuators can be manufactured and integrated during at least one of component and subassembly manufacturing 2006, system integration 2008, or maintenance and service 2014. For example, the flow control systems can be implemented during the manufacturing of aircraft 2100. In other illustrative examples, flow control systems can be implemented, upgraded, or maintained during maintenance and service 2014, which can include modification, reconfiguration, refurbishment, and other maintenance or service for aircraft 2100.

Figure 22:
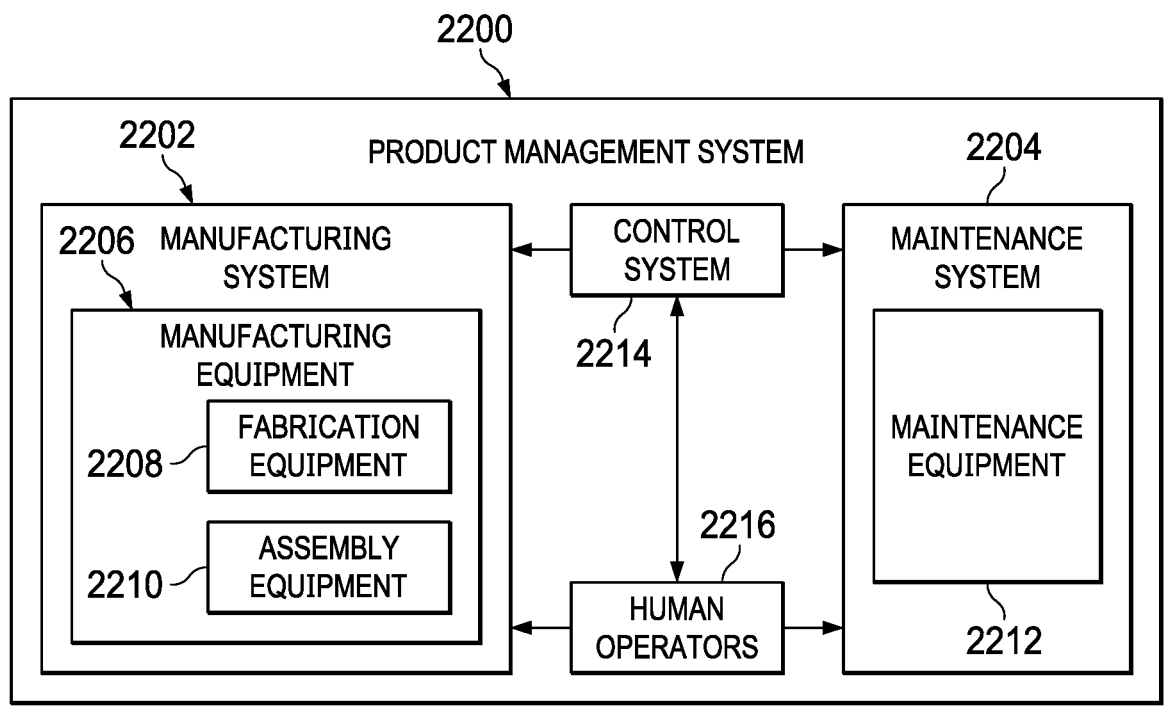
FIG. 22 is an illustration of a block diagram of a product management system in accordance with an illustrative embodiment.

Turning now to FIG. 22, an illustration of a block diagram of a product management system is depicted in accordance with an illustrative embodiment. Product management system 2200 is a physical hardware system. In this illustrative example, product management system 2200 includes at least one of manufacturing system 2202 or maintenance system 2204.

Manufacturing system 2202 is configured to manufacture products, such as aircraft 2100 in FIG. 21. As depicted, manufacturing system 2202 includes manufacturing equipment 2206. Manufacturing equipment 2206 includes at least one of fabrication equipment 2208 or assembly equipment 2210.

Fabrication equipment 2208 is equipment that used to fabricate components for parts used to form aircraft 2100 in FIG. 21. For example, fabrication equipment 2208 can include machines and tools. These machines and tools can be at least one of a drill, a hydraulic press, a furnace, an autoclave, a mold, a composite tape laying machine, an automated placement (AFP) machine, a vacuum system, a robotic pick and place system, a flatbed cutting machine, a laser cutter, a computer numerical control (CNC) cutting machine, a lathe, or other suitable types of equipment. Fabrication equipment 2208 can be used to fabricate at least one of metal parts, composite parts, semiconductors, circuits, fasteners, ribs, skin panels, spars, antennas, or other suitable types of parts.

Assembly equipment 2210 is equipment used to assemble parts to form aircraft 2100 in FIG. 21. In particular, assembly equipment 2210 is used to assemble components and parts to form aircraft 2100 in FIG. 21. Assembly equipment 2210 also can include machines and tools. These machines and tools may be at least one of a robotic arm, a crawler, a faster installation system, a rail-based drilling system, or a robot. Assembly equipment 2210 can be used to assemble parts such as seats, horizontal stabilizers, wings, engines, engine housings, landing gear systems, and other parts for aircraft 2100 in FIG. 21.

In this illustrative example, maintenance system 2204 includes maintenance equipment 2212. Maintenance equipment 2212 can include any equipment needed to perform maintenance on aircraft 2100 in FIG. 21. Maintenance equipment 2212 may include tools for performing different operations on parts on aircraft 2100 in FIG. 21. These operations can include at least one of disassembling parts, refurbishing parts, inspecting parts, reworking parts, manufacturing replacement parts, or other operations for performing maintenance on aircraft 2100 in FIG. 21. These operations can be for routine maintenance, inspections, upgrades, refurbishment, or other types of maintenance operations.

In the illustrative example, maintenance equipment 2212 may include ultrasonic inspection devices, x-ray imaging systems, vision systems, drills, crawlers, and other suitable devices. In some cases, maintenance equipment 2212 can include fabrication equipment 2208, assembly equipment 2210, or both to produce and assemble parts that needed for maintenance.

Product management system 2200 also includes control system 2214. Control system 2214 is a hardware system and may also include software or other types of components. Control system 2214 is configured to control the operation of at least one of manufacturing system 2202 or maintenance system 2204. In particular, control system 2214 can control the operation of at least one of fabrication equipment 2208, assembly equipment 2210, or maintenance equipment 2212.

The hardware in control system 2214 can be implemented using hardware that may include computers, circuits, networks, and other types of equipment. The control may take the form of direct control of manufacturing equipment 2206. For example, robots, computer-controlled machines, and other equipment can be controlled by control system 2214. In other illustrative examples, control system 2214 can manage operations performed by human operators 2216 in manufacturing or performing maintenance on aircraft 2100. For example, control system 2214 can assign tasks, provide instructions, display models, or perform other operations to manage operations performed by human operators 2216. In these illustrative examples can be implemented in control system 2214 to manage at least one of the manufacturing or maintenance of aircraft 2100 in FIG. 21. For example, components in a flow control system such as flow control actuators can be added to or integrated into aircraft parts for use in manufacturing a new aircraft for performing modifications, upgrades, or configuration changes for existing aircraft.

In the different illustrative examples, human operators 2216 can operate or interact with at least one of manufacturing equipment 2206, maintenance equipment 2212, or control system 2214. This interaction can occur to manufacture aircraft 2100 in FIG. 21.

Of course, product management system 2200 may be configured to manage other products other than aircraft 2100 in FIG. 21. Although product management system 2200 has been described with respect to manufacturing in the aerospace industry, product management system 2200 can be configured to manage products for other industries. For example, product management system 2200 can be configured to manufacture products for the automotive industry as well as any other suitable industries.

Some features of the illustrative examples are described in the following clauses. These clauses are examples of features not intended to limit other illustrative examples.

Clause 1

A flow control system comprising:
flow control actuators in an aircraft, wherein the flow control actuators comprise channels having inlets and outlets, wherein the channels are located under a surface of the aircraft and the outlets are in communication with the surface of the aircraft, and wherein pressurized air applied to the inlets cause steady air jets to be emitted at the outlets in which the steady air jets add a momentum to airflow over the surface on the aircraft.

Clause 2

The flow control system according to clause 1 comprising:
a flow control actuator in the flow control actuators has a geometry that increases a velocity of the pressurized air and causes the pressurized air to be emitted as a steady jet.

Clause 3

The flow control system according to one of clauses 1 or 2, wherein a channel in the channels for a flow control actuator in the flow control actuators has a tapered section that increases a velocity in the pressurized air flowing through the tapered section; and wherein a throat in the channel is located after the tapered section and is connected to an outlet in the outlets for the channel and has a smallest cross sectional area in the channel.

Clause 4

The flow control system of according to clause 3 further comprising:
divergent section connected to the tapered section located prior to the throat.

Clause 5

The flow control system according to clause 4 further comprising:
curved section connecting the divergent section to the throat.

Clause 6

The flow control system of according to clause 3 further comprising
a straight section connecting the tapered section to the throat.

Clause 7

The flow control system according to any one of clauses 1, 2, 3, 4, 5, or 6, wherein an outlet in the outlets for a channel in the channels has a first cross section shape and the channel has a second cross section shape.

Clause 8

The flow control system according to any one of clauses 1, 2, 3, 4, 5, 6, or 7 further comprising:
a controller that controls an application of the pressurized air to the inlets to control an amount of the momentum applied to the airflow.

Clause 9

The flow control system of according to clause 8 further comprising:
an air source that generates the pressurized air;
a duct system connecting the air source to the inlets of the flow control actuators; and
a controller that controls a flow of the pressurized air in the duct system into the flow control actuators to generate the steady air jets.

Clause 10

The flow control system of according to clause 9, wherein the controller controls the flow of the pressurized air in the duct system to apply pressurized air with a pressure ratio at the inlets that causes the flow control actuators emit the steady air jets having at least one of a desired velocity profile, desired bulk mass flow versus pressure ratio profile, or a momentum coefficient versus a pressure ratio profile.

Clause 11

The flow control system according to clauses 9 or 10, wherein the controller controls the flow of pressurized air in the duct system to selectively apply the pressurized air to the flow control actuators to emit a set of the steady air jets into the airflow over a set of the control surfaces to pneumatically control a flight of the aircraft using the set of the control surfaces.

Clause 12

The flow control system according to any one of clauses 1, 2, 3, 4, 5, 6, 7, 8, 9, 10, or 11, wherein the control surfaces are selected from at least one of a moveable control surface, a surface on an airfoil, a rudder, an aileron, an elevator, a flap, a spoiler, or a slat.

Clause 13

The flow control system according to any one of clauses 1, 2, 3, 4, 5, 6, 7, 8, 9, 10, 11, or 12, wherein the momentum from the steady air jets causes at least one of a reduction in flow separation of a boundary layer for the airflow from the control surfaces or a pneumatic control of the aircraft using the momentum added to the airflow over the control surfaces.

Clause 14

The flow control system according to any one of clauses 1, 2, 3, 4, 5, 6, 7, 8, 9, 10, 11, 12, or 13, wherein a channel in a flow control actuator is a single channel without a feedback channel.

Clause 15

The flow control system according to any one of clauses 1, 2, 3, 4, 5, 6, 7, 8, 9, 10, 11, 12, 13, or 14, wherein the aircraft is selected from a group comprising a commercial aircraft, a passenger airplane, a rotorcraft, a tilt-rotor aircraft, a tilt wing aircraft, a vertical takeoff and landing aircraft, an electrical vertical takeoff and landing vehicle, and a personal air vehicle.

Clause 16

An aircraft comprising:
a body;
airfoils connected to the body;
control surfaces for the airfoils;
an air source located in the aircraft, wherein the air source operates to generate pressurized air;
a duct system connected to the air source; and
flow control actuators located in an interior under a surface of the aircraft, wherein the flow control actuators have channels without feedback channels, wherein the channels have inlets, outlets, and throats in which the inlets are connected to the duct system, the outlets are in communication with an exterior on the surface of the aircraft and positioned relative to control surfaces for the airfoils and the throats in the channels are connected to the outlets for the channels and have a smallest cross sectional area in the channels; and
a controller in the aircraft, wherein the controller controls the flow of the pressurized air through the duct system into the inlets causes the pressurized air to travel through the channels and be emitted as steady air jets at the outlets into an airflow over the surface on the aircraft during flight of the aircraft, wherein the steady air jets add a momentum to the airflow.

Clause 17

The aircraft according to clause 16, wherein a channel in the channels for a flow control actuator in the flow control actuators has a tapered section that increases a velocity in the pressurized air flowing through the tapered section; and wherein a throat in the channel is located after the tapered section and is connected to an outlet in the outlets for the channel and has a smallest cross sectional area in the channel.

Clause 18

The aircraft according to any one of clauses 16, or 17 further comprising:
a channel in the channels for a flow control actuator in the flow control actuators, wherein the channel has a tapered section that increases a velocity in the pressurized air flowing through the tapered section; and
a throat in a channel in the channels for a flow control actuator in the flow control actuators, wherein the throat is located after the tapered section and is connected to an outlet for the channel and has a smallest cross sectional area in the channel.

Clause 19

The aircraft according to any one of clauses 16, 17, or 18, wherein the momentum from the steady air jets causes at least one of a reduction in flow separation of a boundary layer for the airflow from the control surfaces, a pneumatic control of the aircraft using the momentum added to the airflow over the control surfaces.

Clause 20

The aircraft according to any one of clauses 16, 17, 18, or 19, wherein in the controller controls the flow of the pressurized air to portion of the flow control actuators to emit the steady air jets for the portion of the flow control actuators into the airflow for a set of control surfaces.

Clause 21

The aircraft according to clause 20, wherein the steady air jets for the portion of the flow control actuators emitted into the airflow for the set of control surfaces pneumatically controls a flight of the aircraft using the set of control surfaces.

Clause 22

A method for managing airflow for an aircraft, the method comprising:
controlling, by a controller in the aircraft, a flow of pressurized air into inlets in flow control actuators;
increasing a velocity of the pressurized air flowing through channels in the flow control actuators connected to the inlets in response to a geometry of the channels; and
emitting steady air jets from outlets connected to the channels, wherein the steady air jets are emitted into to airflow over a surface on the aircraft and a momentum to the airflow.

Clause 23

The method according to clause 22, wherein the steady air jets cause at least one of a reduction in flow separation of a boundary layer for the airflow from the control surfaces, a pneumatic control of the aircraft using the momentum added to the airflow over the control surfaces.

Clause 24

The method according to any one of clauses 22 or 23, wherein controlling, by the controller in the aircraft, the flow of the pressurized air into the inlets in the flow control actuators comprises:
controlling, by the controller, the flow of pressured air in a duct system to apply the pressurized air to a portion of the flow control actuators to emit the steady air jets from the portion of the flow control actuators into the airflow over a set of control surfaces to pneumatically control a flight of the aircraft using the set of control surfaces.

Clause 25

A flow control system comprising:
fluidic flow control actuators for an aircraft, wherein each fluidic flow control actuator in the fluidic flow control actuators has a main channel having an inlet, an outlet, a first feedback loop on a first side of the main channel in which the first feedback loop is in communication with the main channel by first ends for the first feedback loop, and a second feedback loop on a second side of the main channel in which the second feedback loop is in communication with the main channel by second ends for the second feedback loop, wherein the main channel, the first ends, and the second ends are bisected by a plane, wherein the first feedback loop extends away from a first side of the plane and the second feedback loop extends away from a second side of the plane,
wherein first feedback loops in first fluidic flow control actuators in the fluidic flow control actuators overlap second feedback loops in fluidic second flow control actuators in the fluidic flow control actuators, and
wherein pressurized air applied to the inlets cause air jets to be emitted at the outlets in which the air jets add a momentum to airflow over a surface on the aircraft.

Thus, the illustrative embodiments provide a method, apparatus, and system for controlling the airflow over and aircraft during flight of the aircraft. In one illustrative example, a flow control system comprises flow control actuators in an aircraft. The flow control actuators comprise channels having inlets and outlets, wherein the channels are located under a surface of the aircraft and the outlets are in communication with the surface of the aircraft. Pressurized air applied to the inlets cause steady air jets to be emitted at the outlets in which the steady air jets add a momentum to airflow over the surface on the aircraft.

With the use of a single channel in which other channels such as feedback loops are absent, the flow control actuator can have a smaller throat cross-section as compared to a fluidic oscillator flow control actuator. Additionally, the flow control actuators in the different examples allow a practical implementation into aircraft where space is limited for adding flow control actuators. In other words, flow control actuators have a geometry in the illustrative examples allow for greater density as compared to a fluidic oscillator flow control actuator. As a result, flow control actuators can be implemented in many types of aircraft using these configurations to add mental to a boundary layer that causes the boundary layer to maintain, recovers, or improve the aerodynamic performance of the aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A flow control system comprising:
   flow control actuators in an aircraft, wherein the flow control actuators comprise channels having inlets and outlets, wherein the channels are located under a surface of the aircraft and the outlets are in communication with the surface of the aircraft, and wherein pressurized air applied to the inlets cause steady air jets to be emitted at the outlets in which the steady air jets add a momentum to airflow over the surface on the aircraft, wherein each channel has a tapered section connected to a divergent section, and wherein the divergent section is connected to a throat, and wherein the divergent section is located between the tapered section and the throat.

2. The flow control system of claim 1, wherein an outlet in the outlets for a channel in the channels has a first cross section shape and the channel has a second cross section shape.

3. The flow control system of claim 1 further comprising:
   a controller that controls an application of the pressurized air to the inlets to control an amount of the momentum applied to the airflow.

4. The flow control system of claim 3 further comprising:
   an air source that generates the pressurized air;
   a duct system connecting the air source to the inlets of the flow control actuators; and
   a controller that controls a flow of the pressurized air in the duct system into the flow control actuators to generate the steady air jets.

5. The flow control system of claim 4, wherein the controller controls the flow of the pressurized air in the duct system to apply pressurized air with a pressure ratio at the inlets to cause the flow control actuators emit the steady air jets having at least one of a desired velocity profile, desired bulk mass flow versus pressure ratio profile, or a momentum coefficient versus a pressure ratio profile.

6. The flow control system of claim 4, wherein the controller controls the flow of pressurized air in the duct system to selectively apply the pressurized air to the flow control actuators to emit a set of the steady air jets into the airflow over a set of control surfaces to pneumatically control a flight of the aircraft using the set of the control surfaces.

7. The flow control system of claim 1, wherein a channel in a flow control actuator is a single channel without a feedback channel.

8. The flow control system of claim 1, wherein the aircraft is selected from a group comprising a commercial aircraft, a passenger airplane, a rotorcraft, a tilt-rotor aircraft, a tilt wing aircraft, a vertical takeoff and landing aircraft, an electrical vertical takeoff and landing vehicle, and a personal air vehicle.

9. An aircraft comprising:
   a body;
   airfoils connected to the body;
   control surfaces for the airfoils;
   an air source located in the aircraft, wherein the air source operates to generate pressurized air;
   a duct system connected to the air source; and
   flow control actuators located in an interior under a surface of the aircraft, wherein the flow control actuators have channels without feedback channels, wherein the channels have inlets, outlets, and throats in which the inlets are connected to the duct system, the outlets are in communication with an exterior on the surface of the aircraft and positioned relative to control surfaces for the airfoils and the throats in the channels are connected to the outlets for the channels and have a smallest cross sectional area in the channels; and
   a controller in the aircraft, wherein the controller controls the flow of the pressurized air through the duct system into the inlets to cause the pressurized air to travel through the channels and be emitted as steady air jets at the outlets into an airflow over the surface on the aircraft during flight of the aircraft, wherein the steady air jets add a momentum to the airflow, wherein a channel in the channels has a tapered section connected to a divergent section, and wherein the divergent section is connected to a throat, and wherein the divergent section is located between the tapered section and the throat.

10. The aircraft of claim 9, wherein the momentum from the steady air jets causes at least one of a reduction in flow separation of a boundary layer for the airflow from the control surfaces or a pneumatic control of the aircraft using the momentum added to the airflow over the control surfaces.

11. The aircraft of claim 9, wherein the controller controls the flow of the pressurized air to a portion of the flow control actuators to emit the steady air jets for the portion of the flow control actuators into the airflow for a set of control surfaces.

12. The aircraft of claim 11, wherein the steady air jets for the portion of the flow control actuators emitted into the airflow for the set of control surfaces pneumatically controls a flight of the aircraft using the set of control surfaces.

13. The flow control system of claim 1, wherein the throat is located between the divergent section and an outlet of the outlets, and wherein the throat has a smallest cross-sectional area in the channel.

14. The flow control system of claim 1 further comprising: a straight section coupled to the tapered section, wherein the tapered section is located between the straight section and the divergent section.

15. The flow control system of claim 1 further comprising: first and second straight sections coupled to the tapered section, wherein the second straight section is coupled between the throat and the tapered section.

16. The aircraft of claim 9, wherein the throat is located between the divergent section and an outlet of the outlets, and wherein the throat has a smallest cross-sectional area in the channel.

17. The aircraft of claim 9 further comprising: a straight section coupled to the tapered section, wherein the tapered section is located between the straight section and the divergent section.

18. A flow control system comprising:
flow control actuators in an aircraft, wherein the flow control actuators comprise channels having inlets and outlets, wherein the channels are located under a surface of the aircraft and the outlets are in communication with the surface of the aircraft, and wherein pressurized air applied to the inlets cause steady air jets to be emitted at the outlets in which the steady air jets add a momentum to airflow over the surface on the aircraft, wherein a channel in the channels has a tapered section connected to a divergent section, and wherein the divergent section is connected to a throat, and wherein the divergent section is located between the tapered section and the throat, and wherein the throat is located between the divergent section and an outlet of the outlets, and wherein the throat has a smallest cross-sectional area in the channel.

19. The flow control system of claim 18 further comprising: a straight section coupled to the tapered section, wherein the tapered section is located between the straight section and the divergent section.

* * * * *